(12) United States Patent
Imanuel

(10) Patent No.: US 12,437,594 B2
(45) Date of Patent: *Oct. 7, 2025

(54) ESTABLISHMENT OF SECURE BLUETOOTH CONNECTION TO INTERNET OF THINGS DEVICES, SUCH AS ELECTRONIC LOCKS

(71) Applicant: ASSA ABLOY Americas Residential Inc., New Haven, CT (US)

(72) Inventor: Derek Imanuel, Irvine, CA (US)

(73) Assignee: ASSA ABLOY Americas Residential Inc., New Haven, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/522,820

(22) Filed: Nov. 29, 2023

(65) Prior Publication Data

US 2024/0096154 A1 Mar. 21, 2024

Related U.S. Application Data

(63) Continuation of application No. 17/722,052, filed on Apr. 15, 2022, now Pat. No. 11,869,295.

(60) Provisional application No. 63/275,550, filed on Nov. 4, 2021, provisional application No. 63/241,804, filed on Sep. 8, 2021, provisional application No. 63/175,360, filed on Apr. 15, 2021.

(51) Int. Cl.
*G07C 9/00* (2020.01)
*G07C 9/22* (2020.01)
*G07C 9/27* (2020.01)
*H04L 9/40* (2022.01)
*H04W 4/80* (2018.01)

(52) U.S. Cl.
CPC ........... *G07C 9/27* (2020.01); *G07C 9/00309* (2013.01); *G07C 9/22* (2020.01); *H04L 63/0442* (2013.01); *H04L 63/0823* (2013.01); *H04L 63/0869* (2013.01); *H04W 4/80* (2018.02); *G07C 2009/00388* (2013.01); *G07C 2009/00396* (2013.01); *G07C 2009/00412* (2013.01); *G07C 2009/00769* (2013.01); *H04L 2463/062* (2013.01)

(58) Field of Classification Search
CPC ........... G07C 9/22; G07C 9/27; H04W 12/50; H04W 12/069
See application file for complete search history.

(56) References Cited

U.S. PATENT DOCUMENTS 9,424,700 B2 8/2016 Lovett et al.
2013/0335193 A1 12/2013 Hanson et al.
(Continued)

FOREIGN PATENT DOCUMENTS

WO 2016023558 A1 2/2016
WO 2019240669 A1 12/2019
WO 2020056272 A1 3/2020

OTHER PUBLICATIONS

International Search Report and Written Opinion, PCT/US2022/025030, mailed Aug. 4, 2022.

*Primary Examiner* — Nabil H Syed
(74) *Attorney, Agent, or Firm* — Merchant & Gould P.C.

(57) ABSTRACT

Systems and methods are disclosed for managing secure connection between a mobile device and an Internet of things device, such as an electronic lock. In some instances, a mutual authentication process is performed, and public keys are exchanged. Once keys are exchanged, subsequent communication between the devices may be encrypted using a shared key generated using the exchanged keys.

20 Claims, 14 Drawing Sheets

(56) References Cited

U.S. PATENT DOCUMENTS

2014/0049370 A1    2/2014   Eberwine et al.
2019/0206165 A1    7/2019   Chang et al.
2020/0028672 A1    1/2020   Tang

ESTABLISHMENT OF SECURE BLUETOOTH CONNECTION TO INTERNET OF THINGS DEVICES, SUCH AS ELECTRONIC LOCKS

CROSS-REFERENCE TO RELATED APPLICATIONS

The present application is a continuation of U.S. patent application Ser. No. 17/722,052, filed Apr. 15, 2022, now U.S. Pat. No. 11,869,295, which claims priority, to the extent appropriate, to each of the following applications: U.S. Provisional Patent Application No. 63/175,360, filed Apr. 15, 2021; U.S. Provisional Patent Application No. 63/241,804, filed Sep. 8, 2021; and U.S. Provisional Patent Application No. 63/275,550 filed Nov. 4, 2021, the disclosures of each application hereby incorporated by reference in their entirety.

TECHNICAL FIELD

The present invention relates to Internet of Things (IoT) Devices, and more particularly, to establishing and managing a secure connection between a computing device, such as a mobile device, and an IoT device, such as an electronic lock.

BACKGROUND

Many Internet of things devices use Bluetooth for communication with mobile devices, such as smart phones. Bluetooth communication connections may be used for device setup, or for purposes of activating such devices. Often, setup is a onetime process for a user, especially in the context of Home Automation devices.

Increasingly, electronic locks have been integrated into Home Automation Systems in both single family and multifamily environments. Especially in multifamily environments, there may be a large number of mobile devices that would be granted access to actually such electronic locks (e.g., on the next your rear door of an apartment building). Additionally, in some instances, such as for homes that are available for use via a short term rental (e.g., via AirBNB, VRBO, or other vacation rental organizations), it may be desirable to provide a short time frame credential to a guest user.

When Bluetooth is used for connection between an electronic lock and a mobile device, typically the electronic lock will act as the server device for the Bluetooth connection, and the mobile device will act as a client device. Accordingly, the electronic lock may be required to store long-term bonding keys that maintain a secure and authenticated communication channel between the lock and mobile device.

This leads to some significant drawbacks where large numbers of users may be required to connect to the electronic lock, or where changes in bonding between mobile devices and electronic locks occur frequently. In particular, the electronic lock may have a limit on a number of long term bonding keys that may be stored. This limits the number of devices that can be bonded and paired to the lock. Additionally, in some cases (e.g., in the instance of a mobile device operating using iOS), a re-pairing or rebonding process requires a user to manually remove a pairing before the re-pairing may be performed.

SUMMARY

In general the present disclosure relates to management of a secure connection between a mobile device and an Internet of things device, such as an electronic lock. In some instances, a mutual authentication process is performed, and public keys are exchanged. Once keys are exchanged, subsequent communication between the devices may be encrypted using the exchanged keys, thereby avoiding the requirement of bonding the two devices.

In a first aspect, a method of establishing secure communication with a mobile device at an electronic lock is disclosed. The method includes establishing a communication connection with a mobile device over a short-range wireless communication protocol. The method also includes performing at least a portion of a mutual authentication process in which the electronic lock is authenticated to the mobile device and the mobile device is authenticated to the electronic lock. The method includes performing a key generation process to generate an encryption key and a decryption key at the electronic lock. The method further includes performing encrypted communication with the mobile device using the generated encryption key and decryption key, the encrypted communication occurring using the short-range wireless communication protocol.

In a second aspect, an electronic lock includes a programmable circuit and a short-range wireless communication interface communicatively coupled to the programmable circuit. The lock further includes a memory storing instructions which, when executed, cause the programmable circuit to: establish a communication connection with a mobile device over a short-range wireless communication protocol via the short-range wireless communication interface; perform at least a portion of a mutual authentication process in which the electronic lock is authenticated to the mobile device and the mobile device is authenticated to the electronic lock; perform a key generation process with the mobile device to generate an encryption key and a decryption key at the electronic lock; and perform encrypted communication with the mobile device using the generated encryption key and decryption key, the encrypted communication occurring via an unbonded connection using the short-range wireless communication protocol via the short-range wireless communication interface.

In a third aspect, a method of establishing secure communication between a mobile device and an electronic lock is disclosed. The method includes establishing a communication connection between an electronic lock and a mobile device over a short-range wireless communication protocol. The method further includes performing a mutual authentication process in which the electronic lock is authenticated to the mobile device and the mobile device is authenticated to the electronic lock. The method includes performing a key generation process including: generating, at the electronic lock, a lock salt, a lock public key, and a lock private key, the lock public key and lock private key forming a lock public-private key pair; generating, at the mobile device, a device salt, a device public key and a device private key, the device public key and device private key forming a device public-private key pair; generating a platform signature at a platform cloud, the platform signature being a platform digest signed by a platform private key, the platform digest formed from the device salt and device public key; generating a lock signature at the electronic lock, the lock signature being a lock digest signed by a lock private key, the lock digest formed from the lock salt and lock public key; verifying the platform signature at the electronic lock using a platform public key verifying the lock signature at the platform cloud using the lock public key; based on verifying the platform signature at the electronic lock, generating a lock encryption key and a lock decryption key at the electronic lock; and, based on verifying the lock signature at the platform cloud, generating a mobile device encryption key and a mobile device decryption key at the mobile device. The method further includes performing encrypted communication between the mobile device and the electronic lock using the mobile device encryption key, the mobile device decryption key, the lock encryption key, and the lock decryption key, the encrypted communication occurring via an unbonded connection using the short-range wireless communication protocol.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
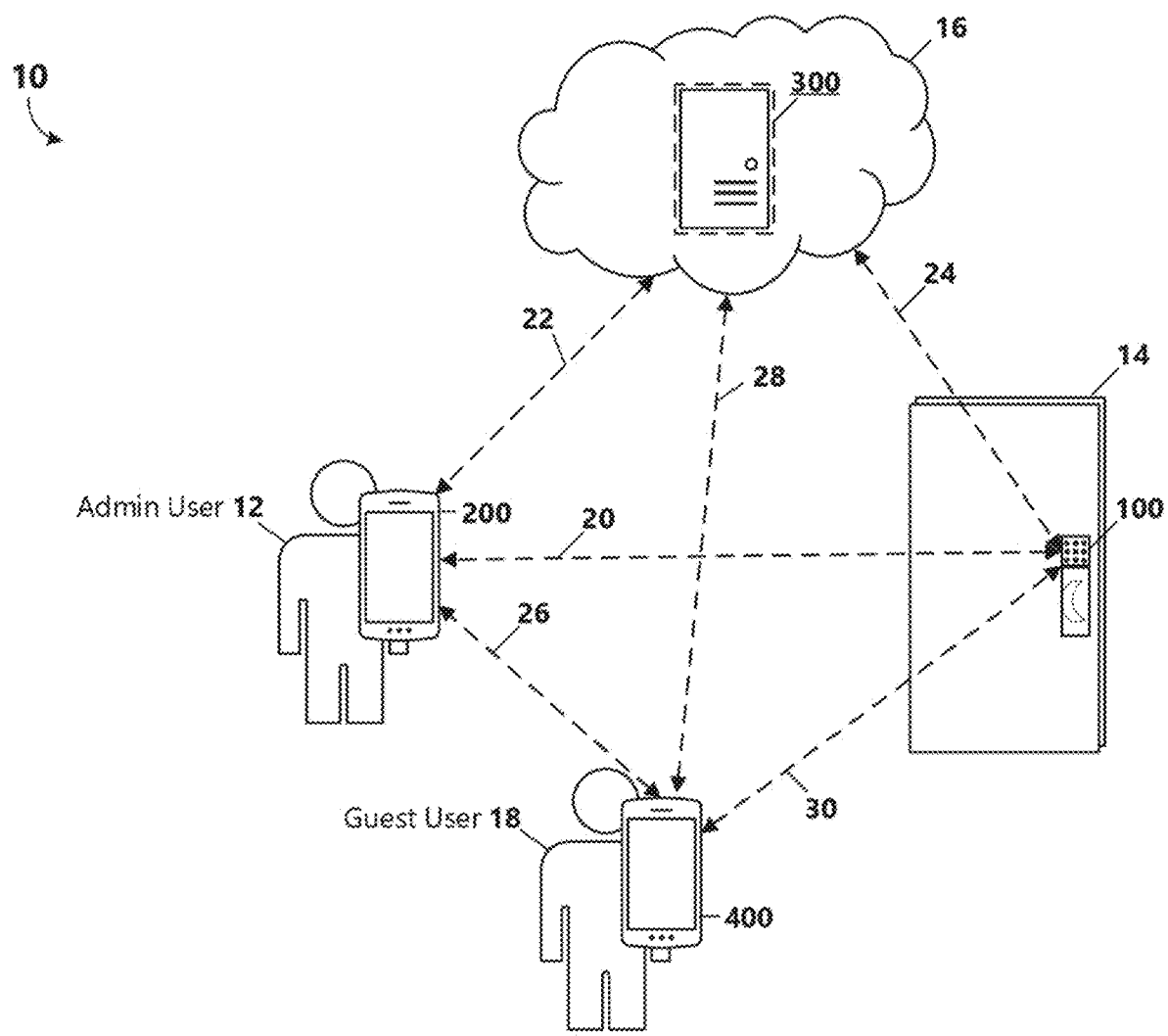
FIG. 1 illustrates an environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to management of a secure connection between a mobile device and an Internet of things device, such as an electronic lock. In some instances, a bonding process may be performed to establish a trusted connection between the devices. A mutual authentication process is performed, and public keys are exchanged over the bonded connection. Once keys are exchanged, the bonded connection may be terminated. Subsequent communication between the devices may be encrypted using the exchanged keys, thereby avoiding the requirement of maintaining a bonding between the two devices.

In accordance with the present disclosure, the general method described herein allows for either avoidance of a bonding process between two devices communicating over Bluetooth, or use of a long-term key for Bluetooth pairing in a temporary manner. The long-term bonding key may be used for purposes of temporarily exchanging other keys that may be used for encrypting and securing an otherwise unsecure communication path. The unsecured communication path does not use the Bluetooth LE Secure Connection mechanism, and therefore is not limited in terms of number of keys or manner of pairing. Accordingly, the methods described herein may be particularly applicable in contexts where a large number of users may wish to connect to a single device. One such example would be an electronic lock presented in a multifamily context (e.g., a common door of a condominium or apartment complex). In such instances, the number of users wishing to be granted access to operate the electronic lock may exceed the number of bonding keys that are available to be established at the electronic lock (i.e., the number being set by the specific Bluetooth protocol and/or chipset). Use of an alternative key arrangement allows for use of the same key by multiple users, or separate keys which are not required to be stored within the Bluetooth chipset itself as part of a bonding implementation.

FIG. 1 illustrates an environment 10 in which aspects of the present disclosure may be implemented. A door 14 comprising an electronic lock 100 (also referred to as a wireless electronic lockset) is installed at a premises.

An administrative user 12 is a master user or an authorized person, such as an owner or tenant of the premises where the door 14 comprising the electronic lock 100 is installed. The administrative user 12 has a mobile device (herein referred to as admin mobile device 200) with wireless communication capabilities, such as a smartphone or tablet. The admin mobile device 200 is capable of communicating 22 with a server 300, communicating 20 with the electronic lock 100, and communicating 26 with a phone or other mobile device (herein referred to as guest mobile device 400) of a guest user 18.

The guest user 18 is a person whom the administrative user 12 may wish to grant access to perform at least a subset of actions (e.g., lock, unlock, change settings) associated with the electronic lock 100. In some examples, the guest user 18 may be a short-time guest, such as a vacation rental user. The guest user 18 may also be a longer-term user who may not be given administrative access rights to the electronic lock 100. The administrative user 12 may wish to allow the guest user 18 to pair the guest mobile device 400 with the electronic lock 100 for enabling the guest user 18 to perform electronic lock actions via the guest mobile device 400. The administrative user 12 may also wish to allow the guest user 18 to pair the guest mobile device 400 with the electronic lock 100 without requiring the admin mobile device 200 to be within wireless communication range of the electronic lock 100, and without requiring the guest user 18 to actuate a pairing button of the electronic lock 100. The guest mobile device 400 is capable of communicating 28 with the server 300, communicating 30 with the electronic lock 100, and communicating 26 with the admin mobile device 200.

In some further examples, the administrative user 12 or guest user 18 may include an installer of the electronic lock, for example a builder or installer at a multifamily building who may wish to connect to the electronic lock 100 to perform installation processes such as assigning a location to the electronic lock, performing an over-the-air update process with respect to the electronic lock, or other types of actions. In such a circumstance, the installer (who, as either an administrative user 12 or guest user 18, may use a mobile device 200, 400 to initiate communication with the electronic lock to perform installation processes. As with other circumstances, the installer is a user for whom a pairing key would typically not be desired to be maintained in finite memory locations of the electronic lock.

The server 300 can be, for example, a physical server or a virtual server hosted in a cloud storage environment 16. In some embodiments, the electronic lock 100 is also capable of communicating 24 with the server 300. Such communication can optionally occur via one or more wireless communication protocols, e.g., Wi-Fi (IEEE 802.11), short-range wireless communication to a Wi-Fi bridge, or other connection mechanism. According to an embodiment, the server 300 generally creates and stores an administrative user account associated with the electronic lock 100, stores a pairing passcode for the electronic lock, stores a guest user account associated with the electronic lock, and in some examples, upon creation of the guest user account, provides the pairing passcode to the guest mobile device 400. According to an aspect, when the pairing passcode is successfully entered using a keypad of the electronic lock 100, the electronic lock 100 may enter a pairing mode which enables the electronic lock 100 to pair with the guest mobile device 400 over a Bluetooth connection. As noted above, this "pairing" process may be performed by either temporarily using the existing Bluetooth pairing process implemented in typical Bluetooth chipsets, or by avoiding use of that pairing process entirely, and separately managing encryption keys for connection between devices.

Figure 2:
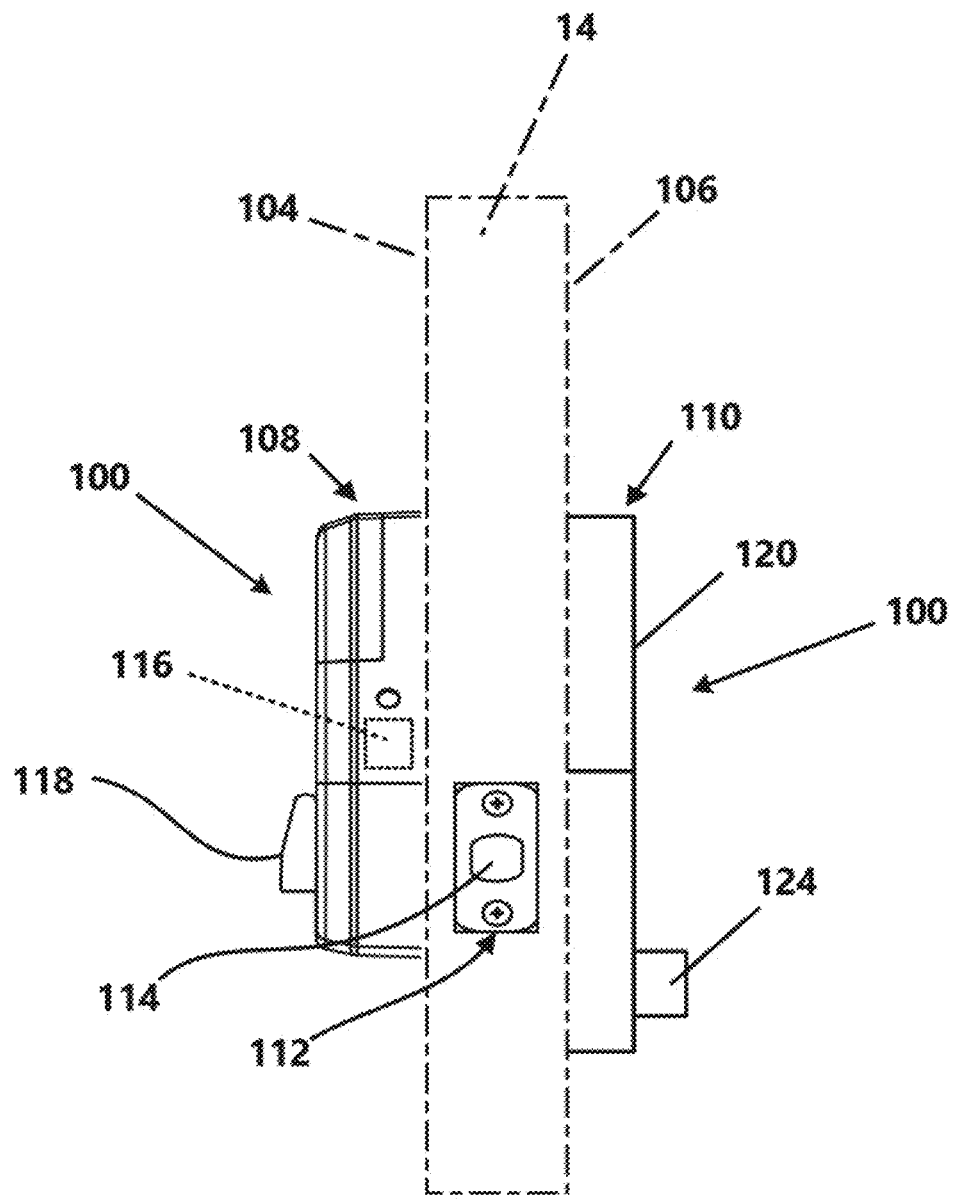
FIG. 2 illustrates a side view of a portion of the electronic lock seen in the environment of FIG. 1.
Figure 3:
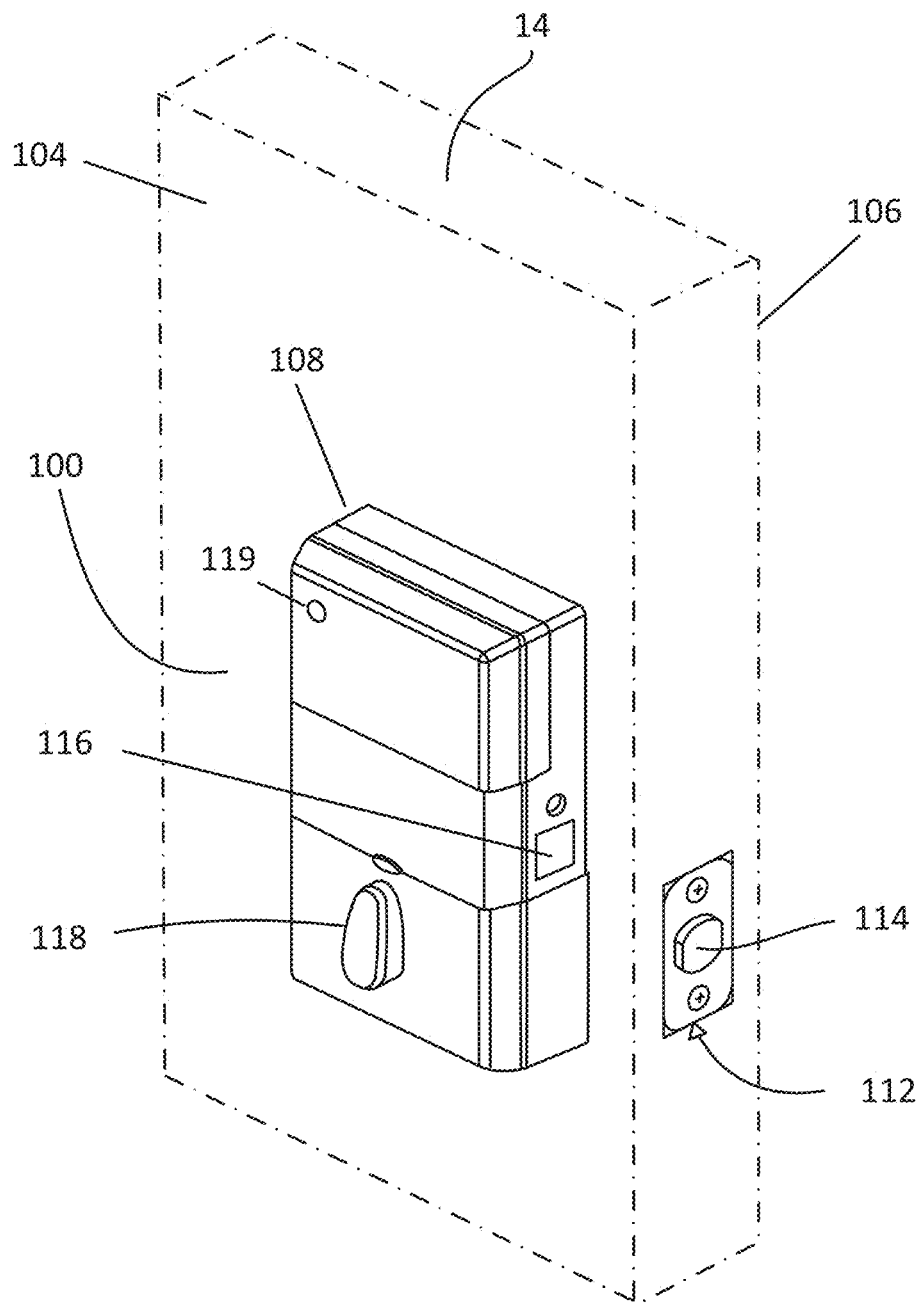
FIG. 3 illustrates a rear perspective view of a portion of the electronic lock seen in the environment of FIG. 1.
Figure 4:
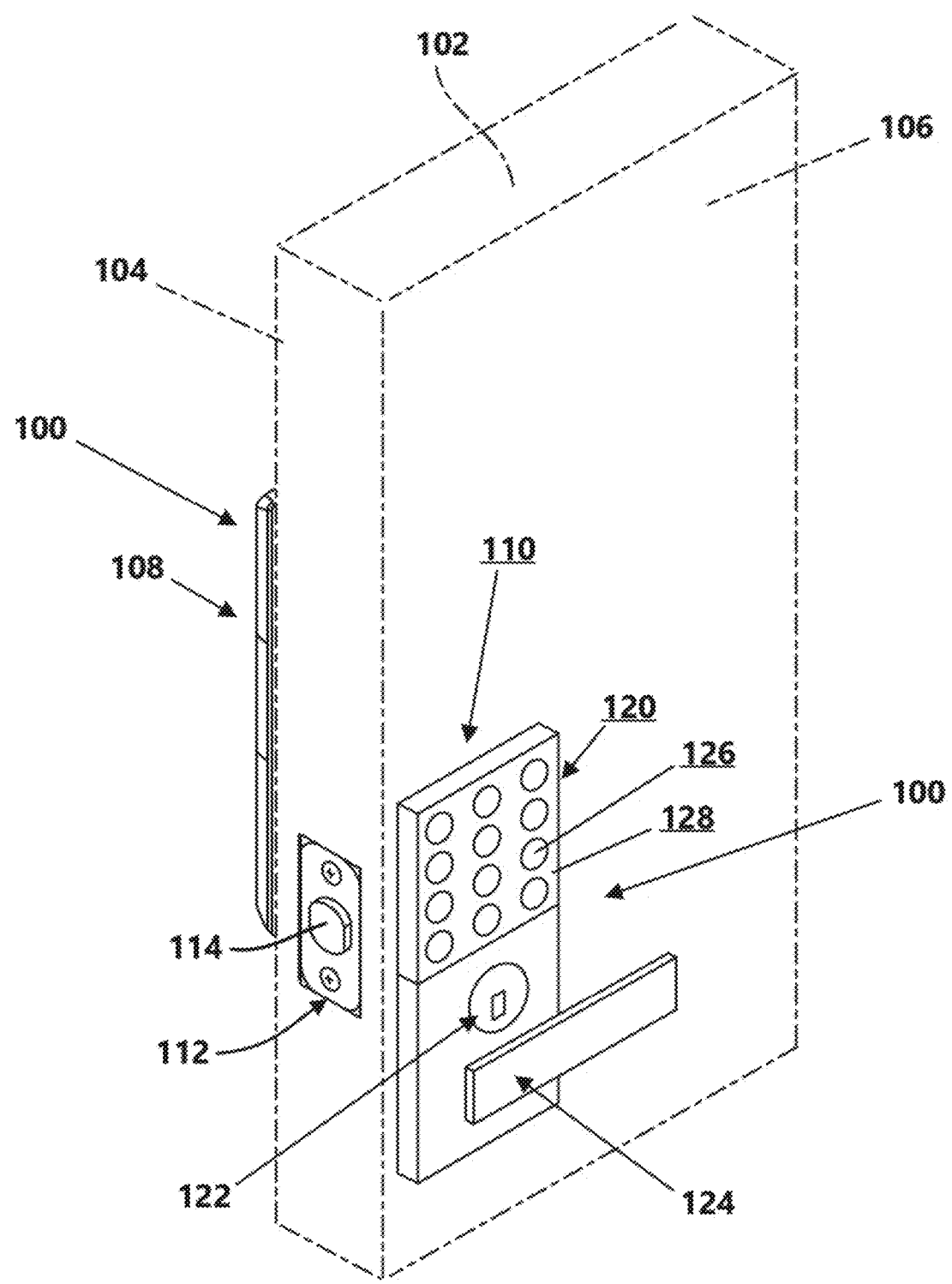
FIG. 4 illustrates a front perspective view of a portion of the electronic lock seen in the environment of FIG. 1.

FIGS. 2-4 illustrate an electronic lock 100 as installed at a door 14, according to one example of the present disclosure. The door 14 has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 14 is in an unlocked state. When the bolt 114 is extended, the bolt 114 protrudes from the door 14 into a doorjamb (not shown) to place the door in a locked state.

In some examples, the interior assembly 108 is mounted to the interior side 104 of the door 14, and the exterior assembly 110 is mounted to the exterior side 106 of the door 14. The latch assembly 112 is typically at least partially mounted in a bore formed in the door 14. The term "outside" is broadly used to mean an area outside the door 14 and "inside" is broadly used to denote an area inside the door 14.

With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

Referring to FIG. 3, the interior assembly 108 can include a processing unit 116 (shown schematically) containing electronic circuitry for the electronic lock 100. In some examples, the interior assembly 108 includes a manual turn piece 118 that can be used on the interior side 104 of door 14 to move the bolt 114 between the extended and retracted positions. The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device, and may be embodied as a standalone unit or as a device shared with components of the electronic lock 100. The processing unit 116 may include memory communicatively interfaced to the processor, for storing the software instructions. Alternatively, the electronic lock 100 may further comprise a separate memory device for storing the software instructions that is electrically connected to the processing unit 116 for the bi-directional communication of the instructions, data, and signals therebetween.

In some examples, the interior assembly 108 includes a pairing button 119 (shown schematically), which when actuated, initiates a BLE communication pairing mode. For example, the pairing mode may enable the electronic lock 100 to communicate with a mobile device (e.g., admin mobile device 200, guest mobile device 400) within wireless communication range for enabling the mobile device to be paired with the electronic lock 100. As can be appreciated, initiating the BLE pairing mode via an actuation of the pairing button 119 may be limited to users who have access to the interior side 104 of the door 14.

As will be described in further detail below, aspects of the present disclosure enable a user, such as an administrative user 12 or a guest user 18, to initiate a BLE communication with electronic lock 100 from a mobile device instead of using pairing button 119. In such instances, a pairing sequence may be initiated that ultimately does not result in a persistent, bonded pairing between the devices. In some instances, pressing the pairing button 119 may cause a bonded, persistent pairing arrangement to occur, while initiating a communication link between the electronic lock 100 and a mobile device 200, 400 using an application installed on the mobile device avoids persisting a bonded pairing arrangement. In other instances, pressing the pairing button 119 also avoids maintaining a persistent pairing using a bonded connection.

Referring to FIG. 4, the exterior assembly 110 can include exterior circuitry communicatively and electrically connected to the processing unit 116. For example, the exterior assembly 110 can include a keypad 120 for receiving a user input and/or a keyway 122 for receiving a key (not shown). The exterior side 106 of the door 14 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid actuation passcode into the keypad 120, the bolt 114 is moved between the extended and retracted positions. In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 14. When the user inputs a valid actuation passcode via the keypad 120 that is recognized by the processing unit 116, an electrical motor is energized to retract the bolt 114 of latch assembly 112, thus permitting door 14 to be opened from a closed position. In a particular embodiment, when a guest user 18 inputs a valid pairing passcode into the keypad 120, the electronic lock 100 may enter into a pairing mode where the electronic lock 100 is enabled to communicate and be paired with the guest mobile device 400 when the guest mobile device is within wireless communication range of the electronic lock 100. Still further, an electrical connection between the exterior assembly 110 and the interior assembly 108 allows the processing unit 116 to communicate with other features included in the exterior assembly 110, as noted below.

The keypad 120 can be any of a variety of different types of keypads. The keypad 120 can be one of a numeric keypad, an alpha keypad, and/or an alphanumeric keypad. The keypad 120 can have a plurality of characters displayed thereon. For example, the keypad 120 can include a plurality of buttons 126 that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In alternative embodiments, one or more other types of user interface devices can be incorporated into the electronic lock 100. For example, in example implementations, the exterior assembly 110 can include a biometric interface (e.g., a fingerprint sensor, retina scanner, or camera including facial recognition), or an audio interface by which voice recognition could be used to actuate the lock. Still further, other touch interfaces may be implemented, e.g., where a single touch may be used to actuate the lock rather than requiring entry of a specified actuation passcode.

Figure 5:
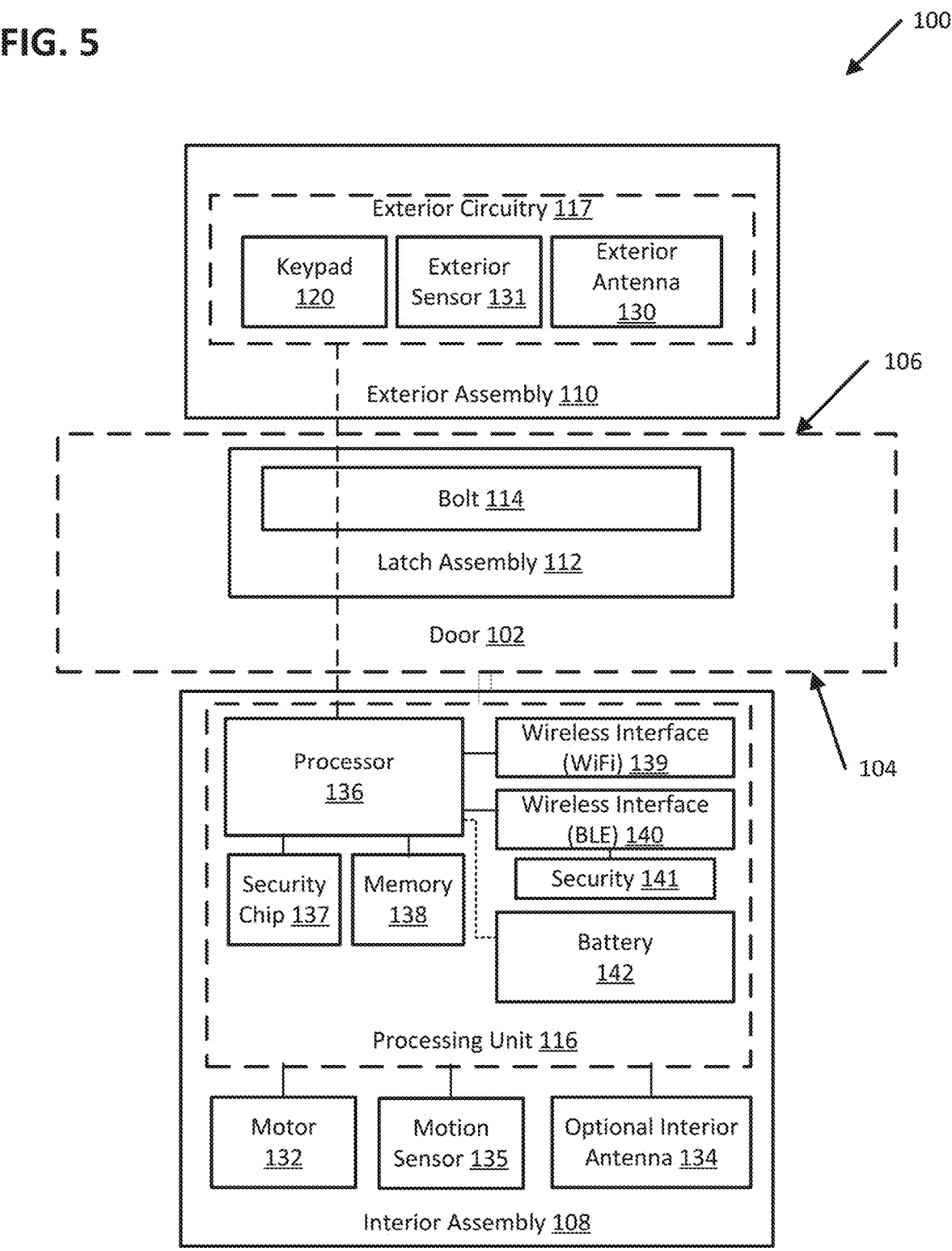
FIG. 5 illustrates a schematic representation of the electronic lock seen in the environment of FIG. 1.

FIG. 5 is a schematic representation of the electronic lock 100 mounted to the door 14. The interior assembly 108, the exterior assembly 110, and the latch assembly 112 are shown.

The exterior assembly 110 is shown to include the keypad 120 and an optional exterior antenna 130 usable for communication with a remote device. In addition, the exterior assembly 110 can include one or more sensors 131, such as a camera, proximity sensor, or other mechanism by which conditions exterior to the door 14 can be sensed. In response to such sensed conditions, notifications may be sent by the electronic lock 100 to a server 300, admin mobile device 200, or guest mobile device 400 including information associated with a sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device (e.g., admin mobile device 200 or guest mobile device 400) that is paired with the electronic lock 100 and determined to be located on the exterior of the door 14 is able to actuate (unlock or lock) the door. This prevents unauthorized users from being located exterior to the door 14 of the electronic lock 100 and taking advantage of an authorized mobile device that may be located on the interior of the door, even though that authorized mobile device is not being used to actuate the door. However, such a feature is not required, but can add additional security. In alternative arrangements, the electronic lock 100 is only actuable from either the keypad 120 (via entry of a valid actuation passcode) or from an application installed on the mobile device (e.g., admin mobile device 200 or guest mobile device 400). In such arrangements, because touch alone at the exterior of the door 14 cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and/or a Bluetooth interface 140), and a battery 142. The processing unit 116 is located within the interior assembly 108 and is capable of operating the electronic lock 100, e.g., by actuating a motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138. In certain embodiments, the processing unit 116 can include a plurality of processors 136, including one or more general purpose or specific purpose instruction processors. In some examples, the processing unit 116 is configured to capture a keypad input event from a user and store the keypad input event in the memory 138. In other examples, the processor 136 receives a signal from the exterior antenna 130, the interior antenna 134, or a motion sensor 135 (e.g., a vibration sensor, gyroscope, accelerometer, motion/position sensor, or combination thereof) and can validate received signals in order to actuate the lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of processor 136. The security chip 137 can, for example, generate and store cryptographic information usable to generate a certificate usable to validate the electronic lock 100 with a remote system, such as the server 300 or mobile device (e.g., admin mobile device 200 or guest mobile device 400). In certain embodiments, the security chip 137 includes a one-time write function in which a portion of memory of the security chip 137 can be written only once, and then locked. Such memory can be used, for example, to store cryptographic information derived from characteristics of the electronic lock 100, or its communication channels with server 300 or one or more mobile devices 200, 400. Accordingly, once written, such cryptographic information can be used in a certificate generation process which ensures that, if any of the characteristics reflected in the cryptographic information are changed, the certificate that is generated by the security chip 137 would become invalid, and thereby render the electronic lock 100 unable to perform various functions, such as communicate with the server 300 or mobile device 200, 400, or operate at all, in some cases.

In some embodiments, the security chip 137 may be configured to generate a pairing passcode that, when entered using the keypad 120 of the electronic lock 100, triggers a BLE pairing mode of the electronic lock 100 that enables the electronic lock 100 to pair with a proximate mobile device (e.g., guest mobile device 400 on which an electronic lock application associated with the electronic lock 100 is operating). In some examples, the pairing passcode is provided to the administrative user 12 upon initial setup/activation of the electronic lock 100 (e.g., via an electronic lock application associated with the electronic lock 100 operating on the admin mobile device 200). In some examples, the pairing passcode is a random value. In some examples, the administrative user 12 may be enabled to change the pairing passcode by setting their own code or by requesting a random value to be generated by the electronic lock application operating on the admin mobile device 200. In some examples, the length of the pairing passcode is variable. According to an aspect, for increased security, the pairing passcode may be a limited-use passcode. For example, the pairing passcode may be limited to a single use or may be active for a preset or administrative user-selected time duration. In further examples, a digit of the pairing passcode may correspond to a setting that may instruct the electronic lock 100 to perform one or more of: disable the pairing passcode after it has been used; keep the pairing passcode enabled after is as been used; or reset the pairing passcode to a new random value after it has been used.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and/or a Bluetooth interface 140. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with one or both of the mobile device 200,400 and server 300 via the Wi-Fi interface, and can communicate with the mobile device 200,400 when the mobile device is in proximity to the electronic lock 100 via the Bluetooth interface 140. In some embodiments, the processing unit 116 is configured to communicate with the mobile device 200, 400 via the Bluetooth interface 140, and communications between the mobile device 200,400 and electronic lock 100 when the mobile device 200, 400 is out of range of Bluetooth wireless signals can be relayed via the server 300, e.g., via the Wi-Fi interface 139.

The Bluetooth interface 140 is an example of a short range wireless interface capable of communicating with devices using a short range wireless protocol. Although Bluetooth is the example interface and protocol shown, other protocols may be used as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi®), the IEEE 802.15.4 standard (Zigbee® and Z-Wave®), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device 200, 400 for communication of an intent to actuate the electronic lock 100. As illustrated in further detail below, the processor 136 can also initiate communication with the server 300 via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server 300; as such, a user (e.g., administrative user 12 or guest user 18) of a mobile device 200, 400 may access an account associated with the electronic lock 100 to view and modify settings of that lock, which are then propagated from the server 300 to the electronic lock 100. In other examples, the processor 136 may communicate with the server 300 via a connection through a mobile device, such as mobile device 200, 400 within range of a short range wireless connection. In alternative embodiments, other types of wireless interfaces can be used; generally, the wireless interface used for communication with a mobile device can operate using a different wireless protocol than a wireless interface used for communication with the server 300.

In a particular example, the Bluetooth interface 140 comprises a Bluetooth Low Energy (BLE) interface. Additionally, in some embodiments, the Bluetooth interface 140 is associated with a security chip 141, for example, a cryptographic circuit capable of storing cryptographic information and generating encryption keys usable to generate certificates for communication with other systems, e.g., mobile device 200, 400. As described further below, the electronic lock 100 may exchange certificates with a mobile device as part of a mutual authentication process used to establish a non-paired, secured connection between the electronic lock and a mobile device. Furthermore, as described previously, the Bluetooth interface 140 may have a finite number of storage locations for bonded device key information. The non-paired, secured connection allows for keys to be exchanged which are not required to be stored in the finite storage locations of the Bluetooth interface 140.

The interior assembly 108 also includes the battery 142 to power the electronic lock 100. In one example, the battery 142 may be a standard single-use (disposable) battery. Alternatively, the battery 142 may be rechargeable. In still further embodiments, the battery 142 is optional altogether, replaced by an alternative power source (e.g., an AC power connection).

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 14 is locked and the motor 132 receives a lock command, then no action is taken. If the door 14 is locked and the motor 132 receives an unlock command, then the motor 132 actuates the bolt 114 to unlock the door 14.

As noted above, the optional interior antenna 134 may also be located in the interior assembly 108. In some examples, the interior antenna 134 is capable of operating together with the exterior antenna 130 to determine the location of the mobile device 200, 400. In some examples, only a mobile device determined to be located on the exterior side 106 of the door 14 is able to unlock (or lock) the door 14. This prevents unauthorized users from being located near the electronic lock 100 and taking advantage of an authorized mobile device that may be located on the interior side of the door 14, even though the authorized mobile device is not being used to unlock the door 14. In alternative embodiments, the interior antenna 134 can be excluded entirely, since the electronic lock 100 is actuated only by an authorized mobile device.

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

In still further example embodiments, the electronic lock 100 can include an integrated motion sensor 135. Using such a motion sensor (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200, 400 in proximity to the electronic lock 100.

Of course, in alternative embodiments, other lock actuation sequences may not require use of a motion sensor 135. For example, if the mobile device 200, 400 is in valid range of the electronic lock 100 when using a particular wireless protocol (e.g., Bluetooth Low Energy), then a connection will be established with the electronic lock 100. Other arrangements are possible as well, using other connection sequences and/or communication protocols.

Figure 6:
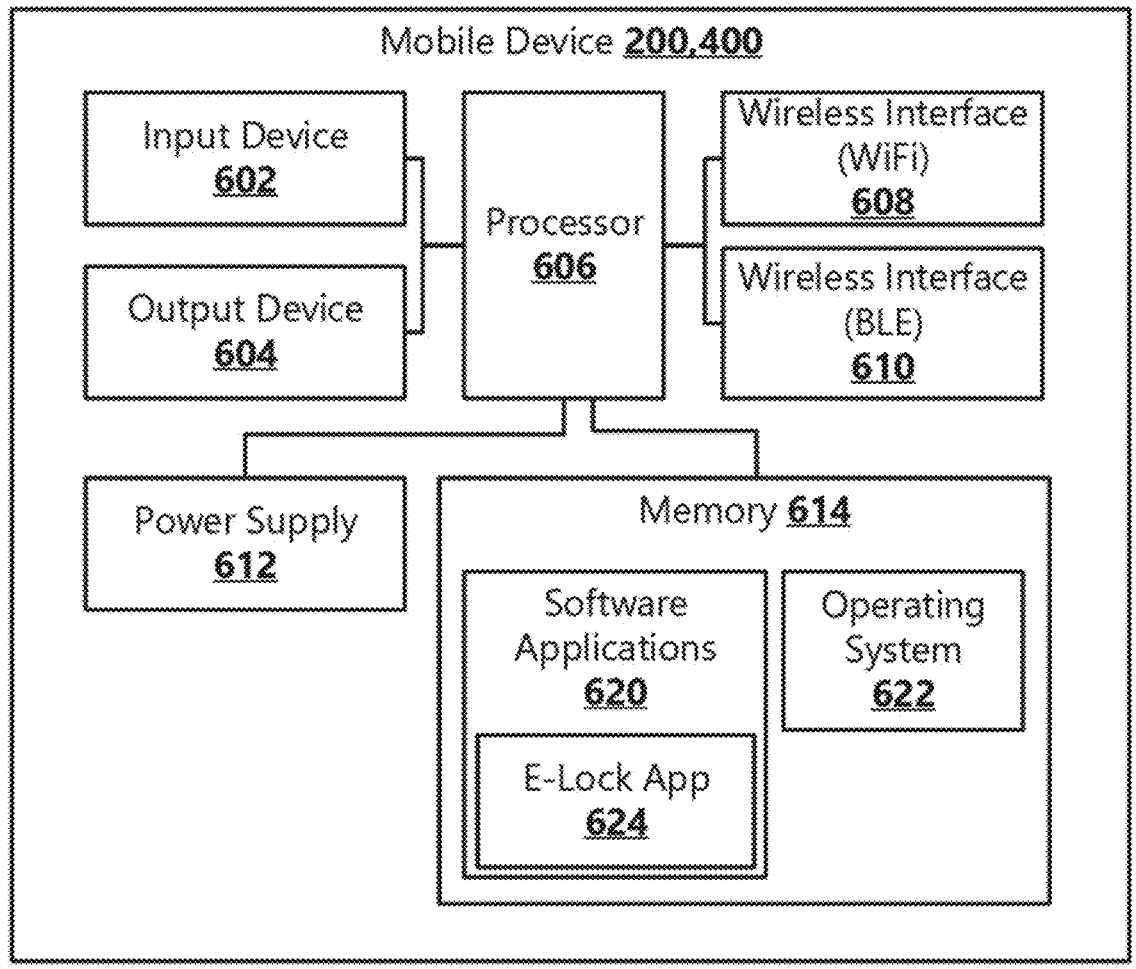
FIG. 6 illustrates a schematic representation of a mobile device seen in the environment of FIG. 1.

FIG. 6 illustrates a schematic diagram of a mobile device, such as admin mobile device 200 and/or guest device 400, usable in embodiments of the disclosure to enable Bluetooth® communication with the electronic lock 100. In some embodiments, the mobile device 200, 400 operates to form a Bluetooth or BLE connection with a network enabled security device such as the electronic lock 100. The mobile device 200, 400 then communicates with the cloud server 300 via a Wi-Fi or mobile data connection. The mobile device 200,400 thus can operate to communicate information between the electronic lock 100 and the server 300. The mobile device 200, 400 shown in FIG. 6 includes an input device 602, an output device 604, a processor 606, a wireless Wi-Fi interface 608, a wireless Bluetooth (e.g., BLE) interface 610, a power supply 612, and a memory 614.

The input device 602 operates to receive input from external sources. Such sources can include inputs received from a user (e.g., the administrative user 12 or the guest user 18). The inputs can be received through a touchscreen, a stylus, a keyboard, etc.

The output device 604 operates to provide output of information from the mobile device 200, 400. For example, a display can output visual information while a speaker can output audio information.

The processor 606 reads data and instructions. The data and instructions can be stored locally, received from an external source, or accessed from removable media. The wireless Wi-Fi interface 608 is similar to the Wi-Fi interface 139. A Wi-Fi connection 22, 28 can be established with the server 300. The wireless BLE interface 610 is similar to the Bluetooth interface 140. A BLE connection 20, 30 can be established with the electronic lock 100. The power supply 612 provides power to the processor 606.

The memory 614 includes software applications 620 and an operating system 622. The memory 614 contains data and instructions that are usable by the processor to implement various functions of the mobile device 200,400.

The software applications 620 can include applications usable to perform various functions on the mobile device 200,400. One such application is an electronic lock application 624. In a particular embodiment, when the electronic lock application 624 is operating on the admin mobile device 200, the electronic lock application 624 can be configured to provide a user interface, setup/activate the electronic lock 100, generate an administrative user account that is associated with the electronic lock 100, present the administrative user 12 with a random pairing passcode for the electronic lock 100 (which may be reset or turned off by the administrative user 12), send (e.g., via a BLE connection 20 with the electronic lock 100 or Wi-Fi connection 22,24) the pairing passcode to the electronic lock 100 for storage, and store the pairing passcode locally on the admin mobile device 200 and/or the server 300. In example implementations, while an admin mobile device 200 may maintain pairing to the electronic lock 100, in some instances, a guest mobile device 400 may not be desired to be bonded to the electronic lock due to the number of guest devices that require lock access, or due to the particular role of the guest (e.g., a short term guest, an installer, etc.)

In another embodiment, the electronic lock application 624 may provide a selectable 'add user' feature, which when selected, enables the administrative user 12 to add another user (e.g., the guest user 18) to have access to the electronic lock 100, receive administrative user-input of the guest user's electronic contact information (e.g., mobile device phone number, email address, messaging application identifier, social media account identifier), generate a link that can be shared with the guest user 18 that allows the guest user 18 to access the electronic lock application 624 and create a guest user account that is associated with the administrative user account and the electronic lock 100, and send a message including the link to the guest mobile device 400 via the received electronic contact information.

In a particular embodiment, responsive to receiving the link and receiving a selection of the link, the electronic lock application 624 may be installed on the guest mobile device 400 and used to create a guest user account that is associated with the administrative user account and the electronic lock 100. When the electronic lock application 624 is operating on the guest mobile device 400, the electronic lock application 624 can be configured to determine when the guest mobile device 400 is in proximity to the electronic lock 100, determine that the guest mobile device 400 is not previously registered for use with the electronic lock 100. In example embodiments described herein, rather than requiring the guest user to perform a pairing process, a mutual authentication process may be performed between the guest mobile device 400 and the electronic lock 100, based on the guest user previously being allowed access to the electronic lock 100 via a created account within the cloud server 300. As described further below, the guest mobile device 400 may establish, via the mutual authentication process, a secure communication connection with the electronic lock 100 via exchanged encryption keys without requiring pairing of the mobile device 400 with the electronic lock 100. Accordingly, for some such guest devices, addition and removal of the guest device from a pairing relationship with the electronic lock 100 can be simplified, and managed entirely via the electronic lock application 624 and electronic lock 100, without regard to the specific Bluetooth implementation on a given guest mobile device 400, and without reserving a limited memory location within the Bluetooth circuitry of the electronic lock 100 for long-term bonding between the guest mobile device 400 and the electronic lock 100. Furthermore, at guest mobile devices 400 not paired with the electronic lock 100 via a BLE connection, the guest mobile device 400 may provide (e.g., display), in a user interface, the pairing passcode and instructions for pairing the guest mobile device 400 with the electronic lock 100. According to an embodiment, when the pairing passcode is entered using the keypad 120 of the electronic lock 100, the electronic lock 100 may be triggered to enter a Bluetooth pairing mode. The electronic lock application 624 may be further configured to determine that the electronic lock 100 is in Bluetooth pairing mode and perform a pairing process with the electronic lock 100, which when completed, enables the guest user 18 to perform at least a subset of electronic lock actions (e.g., actuate the electronic lock 100, add an access/actuation passcode) via the electronic lock application 624.

Figure 7:
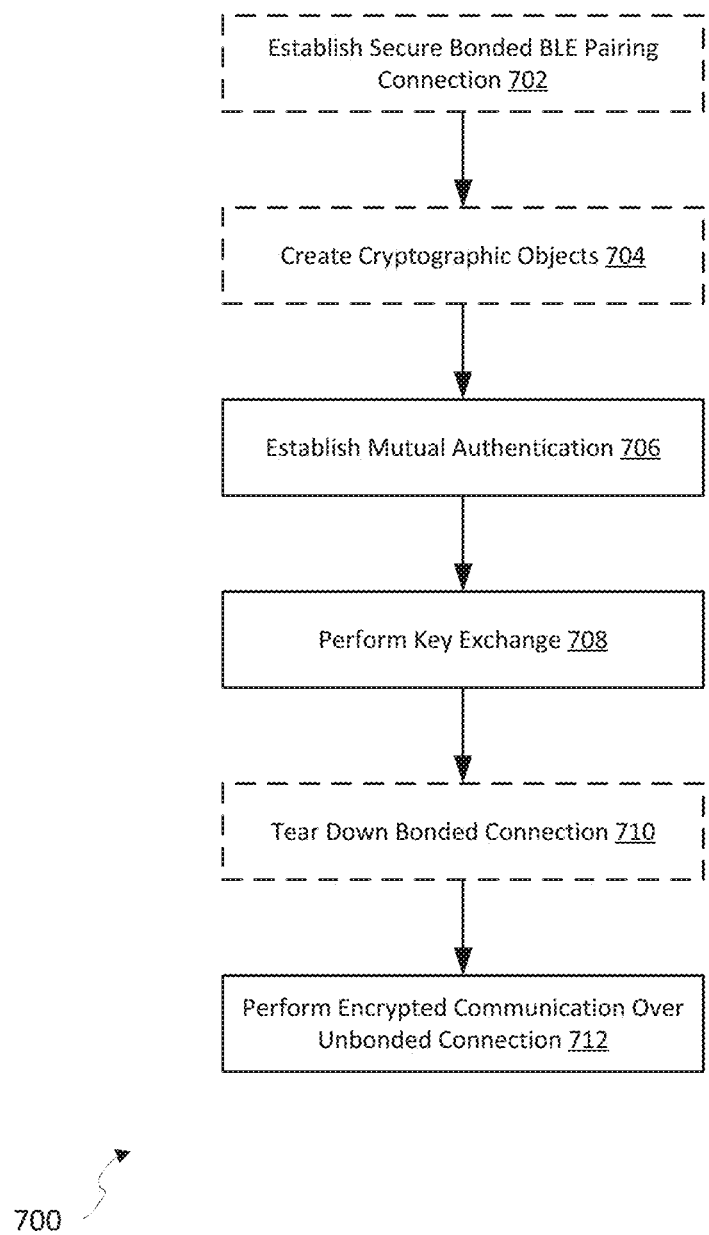
FIG. 7 illustrates a flowchart of a method of managing a secure connection between a mobile device and an electronic lock according to aspects of the present disclosure.

With reference now to FIG. 7, an example flowchart of a method 700 of providing wireless communication pairing of a mobile device, such as the guest mobile device 400, with the electronic lock 100 is shown. Such a wireless communication pairing may be automated (e.g., at the time of installation), or in response to a secure passcode entered by a guest user.

FIG. 7 illustrates a flowchart of a method 700 of managing a secure connection between a mobile device and an electronic lock according to aspects of the present disclosure. Aspects of the method 700 may be performed using an admin mobile device 200, while other aspects may be performed using either the admin mobile device 200 or a guest mobile device 400. The method may be performed, according to different embodiments, either by avoiding use of a Bluetooth bonding process entirely, or by temporarily using a Bluetooth bonding process, then removing the bonding arrangement between devices.

In the example shown, the method 700 includes establishing a secure bonded BLE pairing connection between a mobile device and the Internet of things device, such as electronic lock 100 (step 702). The secure BLE connection may be initiated by a user, for example an administrative user 12, via admin mobile device 200. This may be performed, for example, based on initiation from an electronic lock application 624 or pressing a Bluetooth pairing button 119 on the electronic lock 100.

The use of a secure bonded BLE pairing connection may be performed in only some embodiments, for example where a user (e.g., an administrative user 12) is intending to connect to only a single electronic lock in a temporary or longer-term bonding process. However, in some example embodiments, for example where an installer wishes to connect to a series of electronic locks to assign zones/rights to those locks and/or initiate updates to software of electronic locks, a process may be simplified to avoid use of a bonded connection entirely. Rather, in such circumstances, a mobile device, such as admin mobile device 200 or a guest mobile device 400, may simply detect an electronic lock and connect to that lock using an unsecured short-range communication (e.g., Bluetooth) connection until exchange of keys may be performed, as discussed below.

In the example shown, the method 700 further includes creating cryptographic objects for use in validating the mobile device 200 and electronic lock 100, as well as other mobile devices that may require connection to the electronic lock 100 (step 704). Certificates and or keys, such as public-private key pairs, used by each user account and device for purposes of mutual authentication and securing communication therebetween. Details regarding a process for mutually authenticating a mobile device and an Internet of things device such as an electronic lock are described below.

The method 700 further includes establishing mutual authentication between the mobile device and electronic lock (step 706). In example embodiments, establishing mutual authentication involves exchange of certificates that are generated based at least in part on a shared secret generated by the other of the trusted devices. Methods of performing mutual authentication are described below in FIGS. 10 through 12. Additionally, example methods of performing mutual authentication are provided in, for example, in PCT Publication No. WO 2020/056272, and entitled "Authentication of Internet of Things Devices, including Electronic Locks" the disclosure of which is hereby incorporated by reference in its entirety.

The method 700 also includes performing a key exchange between the mobile device and the electronic lock (step 708). The key exchange may include the electronic lock and generating a lock public key and a lock private key (Lock PuK, Lock PriK, respectively), and either a cloud account or a mobile device generating a device public key and device private key (Device PuK, Device PriK, respectively). The electronic lock may send the lock public-key to the mobile device, and the mobile device may return the device public key. In example embodiments, the key exchange may comprise an elliptical curve Diffie-Hellman (ECDH) key exchange to generate a shared encryption key or shared set of encryption keys or some combination thereof. In some examples, the lock and mobile application will use the exchanged public keys to generate a shared secret key that can be used to encrypt all subsequent communication over Bluetooth between the mobile device and electronic lock.

At this point, the electronic lock 100 and mobile device has exchange sufficient cryptographic information to be able to securely communicate over an otherwise unsecured wireless connection. Accordingly, the method 700 may include tearing down a bonded connection between the mobile device and electronic lock (step 710), for example if such a bonded connection is created in step 702. This can include, for example, unpairing the mobile device and electronic lock such that the electronic lock will not be required to maintain a pairing key within the Bluetooth implementation of the electronic lock for that mobile device.

The method 700 further includes performing encrypted communication over an unbonded connection (step 712). The encrypted communication may be between the mobile device and electronic lock, and may use the shared key for encryption of data to be transmitted over the otherwise unsecured, unbonded connection between the device and lock.

Referring to FIG. 7 generally, it is noted that each of the steps 702-712 are generally performed by the admin mobile device 200 during an initial lock setup process; however, not all such steps are required during subsequent communication between the admin mobile device 200 and electronic lock 100, and not all such steps are required during communication between a guest mobile device 400 and the electronic lock 100. For example because the admin mobile device 200 has already established a set of cryptographic keys used for encrypted communication with the electronic lock, during subsequent communication sequences the admin mobile device 200 may optionally simply use the previously exchanged keys for secured communication (e.g., proceeding directly to step 712).

In the case of initial connection of a guest mobile device 400 to the electronic lock 100, that guest mobile device may be required to be authenticated with the electronic lock prior to exchange of cryptographic keys. Accordingly, although a secure bonding is not required (as in some cases using the admin mobile device 200), in some instances cryptographic objects may be created (or may have already been created (step 704), the guest mobile device 400 may perform a mutual authentication process (step 706) with the electronic lock, and perform a key exchange (step 708). By doing so, such a guest mobile device 400 may validate the identity of the electronic lock 100 using the certificate received from the electronic lock as described below; similarly, the electronic lock 100 may validate the identity of the guest mobile device 400 using a certificate of that device, without requiring a bonded connection. Once certificates are validated for each device, public keys may be exchanged, and a shared key may be generated for use in encrypting subsequent Bluetooth communication (steps 710, 712). During subsequent communication sequences, the guest mobile device 400 may optionally use the shared key, or alternatively the previously-exchanged keys for secured communication (e.g., proceeding directly to step 712).

Referring to FIG. 7 overall, it is noted that some Bluetooth implementations have only a limited number of available key storage locations for bonded devices may be used without regard to the limit as to the number of bondable devices. In example implementations, a Bluetooth solution at electronic lock 100 may only provide for up to 16 pairing keys. However, using the unbonded, encrypted communication described herein, the number of mobile devices (either admin mobile devices 200 or guest mobile devices 400) that are able to communicate with the electronic lock is not so limited, and therefore the approach described herein may be advantageous in arrangements with a large number of users requiring connection to a particular lock.

Figure 8:
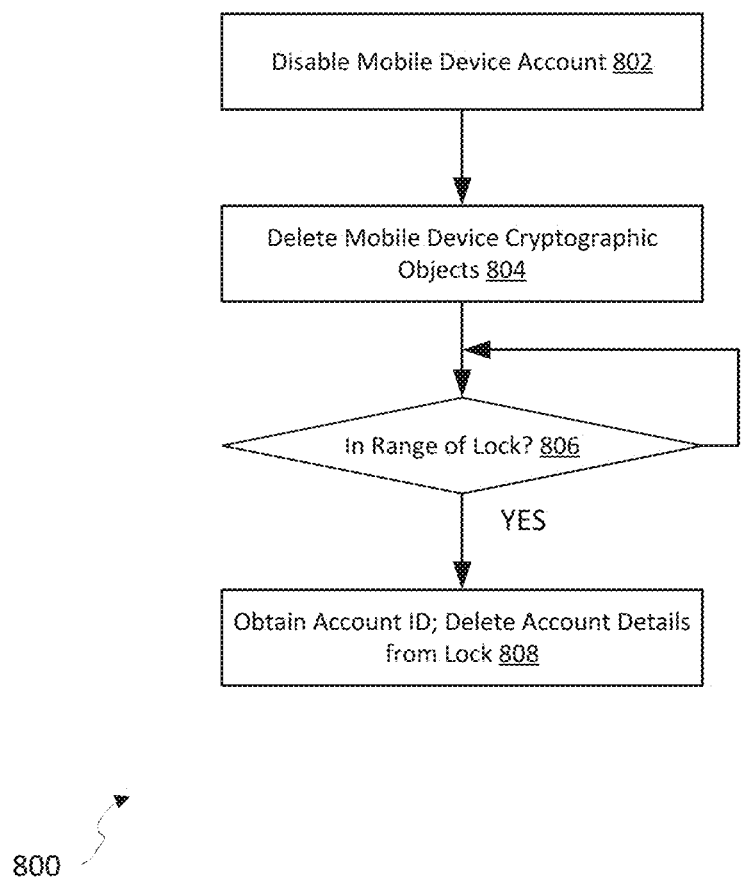
FIG. 8 illustrates a flowchart of a method of disabling a user account previously registered for use with an electronic lock according to an example embodiment.

FIG. 8 illustrates a flowchart of a method 800 of disabling a user account previously registered for use with an electronic lock according to an example embodiment. The method 800 may be performed, for example, with respect to a guest mobile device 400 that is associated with a guest account that has been disabled for use with the electronic lock 100.

In the example shown, the method 800 includes disabling a mobile device account (step 802). Disabling the account can include, for example, receiving an indication from an admin mobile device 200 that a user should be removed from access of the electronic lock 100 using a particular one of the other mobile devices capable of actuating the electronic lock, such as a guest mobile device 400. Disabling the mobile device account can further include receiving an indication in electronic lock application 624 of either an admin mobile device 200 or a guest mobile device 400 that the device (or another device, if received in an electronic lock application of the admin mobile device 200) should be disassociated from the electronic lock 100.

The method 800 further includes deleting cryptographic objects (e.g., the public-private key pair generated by the device, and optionally a pairing key generated based on those keys). This can include, for example, sending a message to the device indicating that its access has been disabled if disabling the account occurred at an admin mobile device 200. Once a mobile device is in range of the electronic lock 100 (at operation 806), an account identifier may be obtained and account details (such as the associated public-private key pair if it is retained after a shared key is generated, mobile device identifier, and shared key) may be deleted from storage of the electronic lock 100. The mobile device coming into range of the electronic lock may be the device associated with the disabled account. In other examples, the mobile device may be the admin mobile device 200, which may store device identifier information and may have rights to add, delete, or modify user accounts at the electronic lock 100. Until such a mobile device is within range of the electronic lock, the electronic lock can simply retain the account information and key information in storage, since the mobile device will be deactivated and prevented from communication with the electronic lock because it will lack cryptographic information required for encrypted communication, and will further lack certificates required for mutual authentication (due to applicable certificates being revoked at the time the account is deactivated). Accordingly, from the perspective of any particular mobile device, such as the admin mobile device 200 or guest mobile devices 400, user management may be performed entirely within cloud accounts, and may avoid unnecessary key storage at the electronic lock itself, or manual removal of a pairing arrangement at a mobile device.

Figure 9:
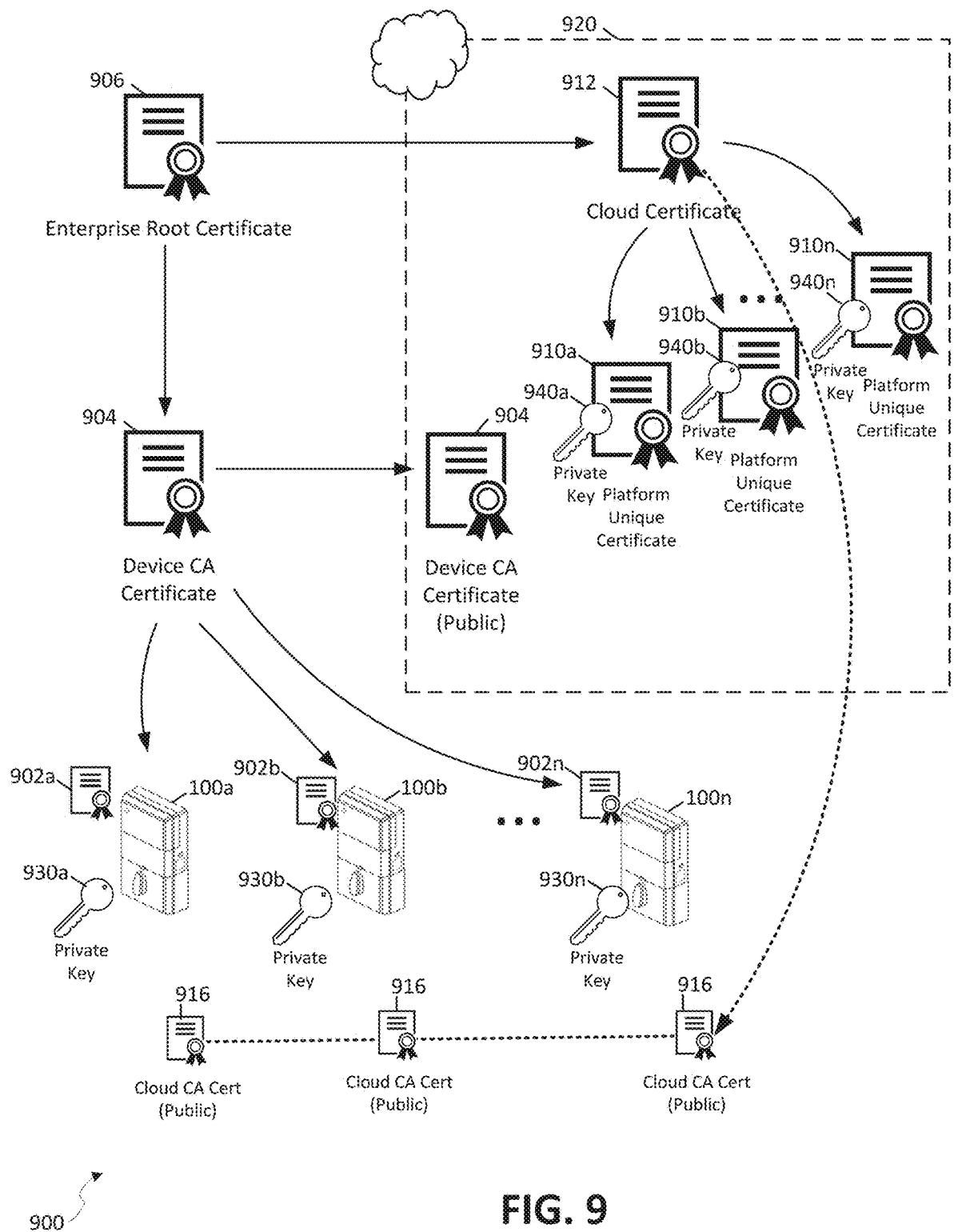
FIG. 9 illustrates a schematic depiction of certificates deployed to user accounts, mobile devices, and electronic locks for mutual authentication, in accordance with an example embodiment.

FIG. 9 illustrates a schematic depiction of an arrangement 900 of certificates deployed to user accounts, mobile devices, and electronic locks for mutual authentication, in accordance with an example embodiment.

In the example shown, each of a number of electronic locks 100a-n may be deployed at various user premises. Each of the electronic locks will be issued a unique device certificate 902a-n, and a corresponding private key 930a-n. For example, the private key may be provisioned at a manufacturer, prior to distribution and installation. The certificate 902 for each electronic lock may include a unique identifier for the electronic lock that may be used within the overall arrangement 900. The private key 930 that is associated with the certificate 902 is used during the mutual authentication process, for example to sign a challenge issued by the server 300 via the electronic lock application 624.

The unique device certificates 902 are signed by a device certificate authority certificate 904 of a device certificate authority. The device certificate authority certificate 904 may be managed securely, for example by a manufacturer of the electronic lock. The device certificate authority certificate 904 is in turn signed by an enterprise root certificate 906. The enterprise root certificate may be, for example, a certificate issued by an enterprise such as a manufacturer of the electronic locks 100, or a certificate authority affiliated with that manufacturer. In this arrangement, the enterprise root certificate 906 corresponds to a self-signed root certificate that may be used across a variety of product lines for a given manufacturer. The device certificate authority certificate 904 similarly may be generated by a device manufacturer or other entity managing accounts of users associated with such devices.

Additionally, one or more partner platform certificates 910*a*-*n* may be maintained within a cloud instance 920 associated with the enterprise. The cloud instance 920 may be a portion of the virtual environment forming the server 300 described above in FIG. 1. The partner platform certificates 910*a*-*n* are each associated with a private key 940*a*-*n* of the partner platform that may be used during the mutual authentication process described below (e.g., to sign a challenge issued by the electronic lock 100). Each of the partner platform certificates 910 may be signed by a cloud certificate 912, corresponding to an enterprise cloud certificate. The cloud certificate 912 may also be signed by the enterprise root certificate 906, and a public cloud certificate authority certificate 916 may be provided to each of the electronic locks for validation, as discussed in further detail below. Generally, the electronic lock receiving the public cloud certificate authority certificate 916 may be stored at the electronic lock to tie the electronic lock to that particular platform and platform certificate.

Briefly, as seen in FIG. 9, two partial certificate chains may be provided to the electronic lock and a cloud instance, respectively, that allow an electronic lock and a user account in the cloud instance to verify each other as legitimate. Accordingly, a certificate chain for both partner platforms and for electronic locks may be validated as trusted by the enterprise via the chain of certificates.

Now referring to FIGS. 10-13, a series of message flow diagrams are shown which, together, form a mutual authentication process useable in conjunction with the certificates described above to securely authenticate a user device to an electronic lock and vice versa, to allow for exchange of key information and subsequently perform encrypted communication between those devices.

In some instances the message flow of FIGS. 10-13 includes providing a user access to electronic lock via a web portal or application. The user may approach the electronic lock 100 with their mobile device 200, 400, which has an application (e.g., electronic lock application 624) installed thereon. The user may be logged into an account associated with that user in the application, where the account has been given access to the lock. When the application is open, the application initiates a BLE scanning process in the background and recognizes the electronic lock.

Figure 10:
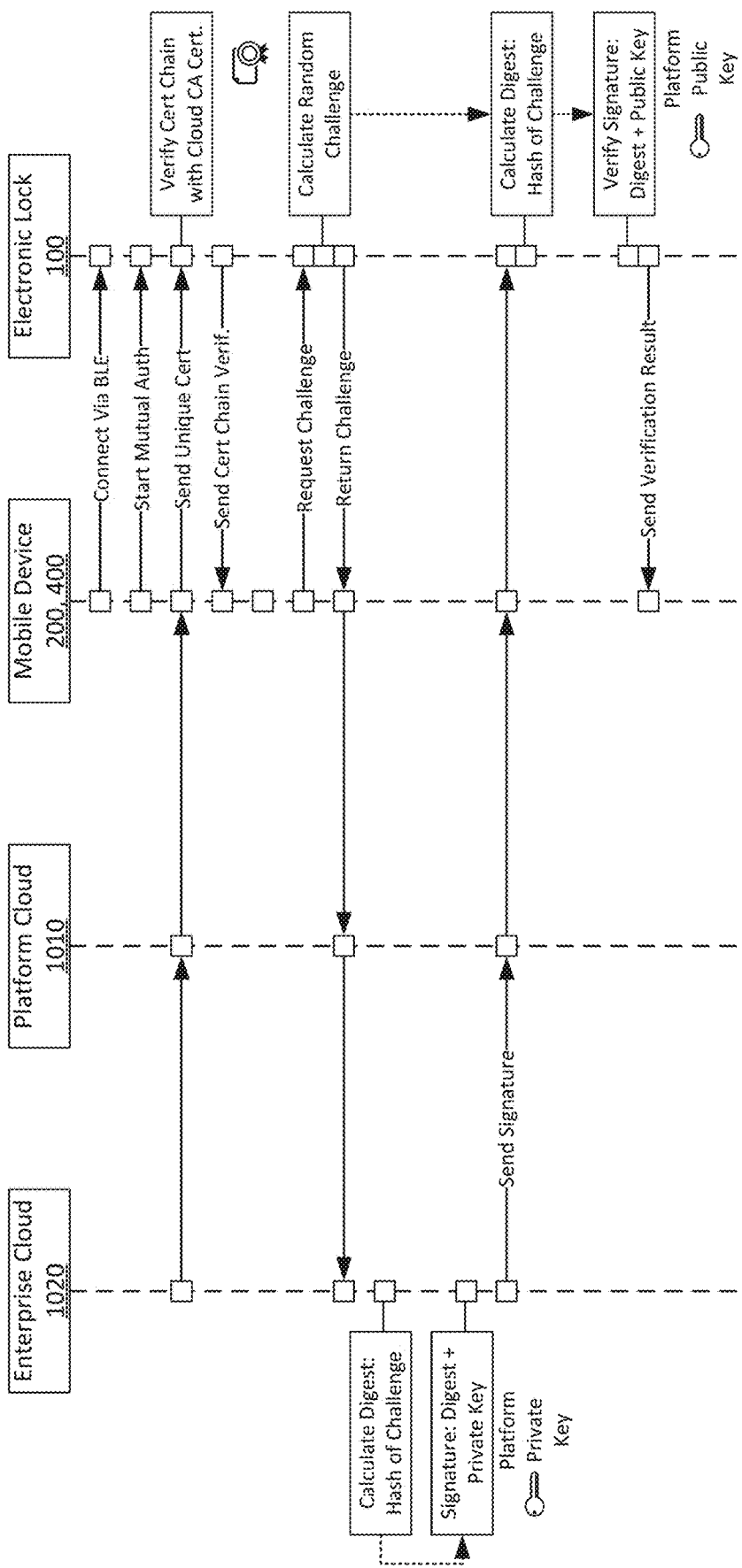
FIG. 10 is a message flow diagram depicting a first portion of a secure communication process including mutual authentication, according to an example embodiment.

FIG. 10 is a message flow diagram depicting a first portion 1000 of a secure communication process including mutual authentication, according to an example embodiment. The message flow diagram of FIG. 10 generally represents an initial connection and a portion of a mutual authentication process in which an electronic lock, such as electronic lock 100 authenticates a cloud provider that is associated with a mobile application, such as electronic lock application 624. The cloud provider may include, for example, a platform cloud 1010 and an enterprise cloud 1020. The platform cloud 1010 and enterprise cloud 1020 may be used for management of certificates and accounts for various user devices, and may provide the functionality of server 300 of FIG. 1.

The electronic lock application 624 on mobile device 200, 400 will receive from a cloud account (e.g., from enterprise cloud 1020 via platform cloud 1010) a unique certificate, and will transmit that unique certificate to the electronic lock 100. Optionally, the electronic lock 100 will verify the certificate chain reflected in the certificate using a certificate authority authorized by the cloud account. Specifically, the electronic lock 100 will verify the unique certificate, for example a partner platform certificate, by determining whether a certificate authority certificate was used to sign that partner platform certificate, thereby indicating its legitimacy.

After certifying the certificate chain, the electronic lock 100 will then send back to the mobile device 200, 400 a verification result of verifying the certificate chain.

If verification passes, the mobile device 200, 400 will send to the electronic lock 100 a random challenge request. The electronic lock 100 will calculate a random challenge and return the random challenge to the mobile device 200, 400. The mobile device 200, 400 will relay the random challenge to a cloud account, e.g., via platform cloud 1010 to enterprise cloud 1020) which calculates a digest represented by a hash of the received challenge. The enterprise cloud 1020 will also calculate a digital signature using the digest and a private key of the platform cloud (e.g., key 940 described above). The cloud account will return a digital signature to the mobile device 200, 400, which in turn provides the digital signature to the electronic lock 100. The electronic lock 100 will similarly calculate a digest represented as a hash of the challenge that was sent to the mobile device 200, 400, and will verify a digital signature by using the calculated digest and a public key of the platform cloud (e.g., a public key of a public private key pair formed with private key 940). The electronic lock 100 will send to the mobile device 200, 400 a result of verifying the validation of the digital signature. In this way, the mobile device can receive validation that the electronic lock has validated the cloud platform. At this stage, the cloud platform has been authenticated to the electronic lock 100.

Figure 11:
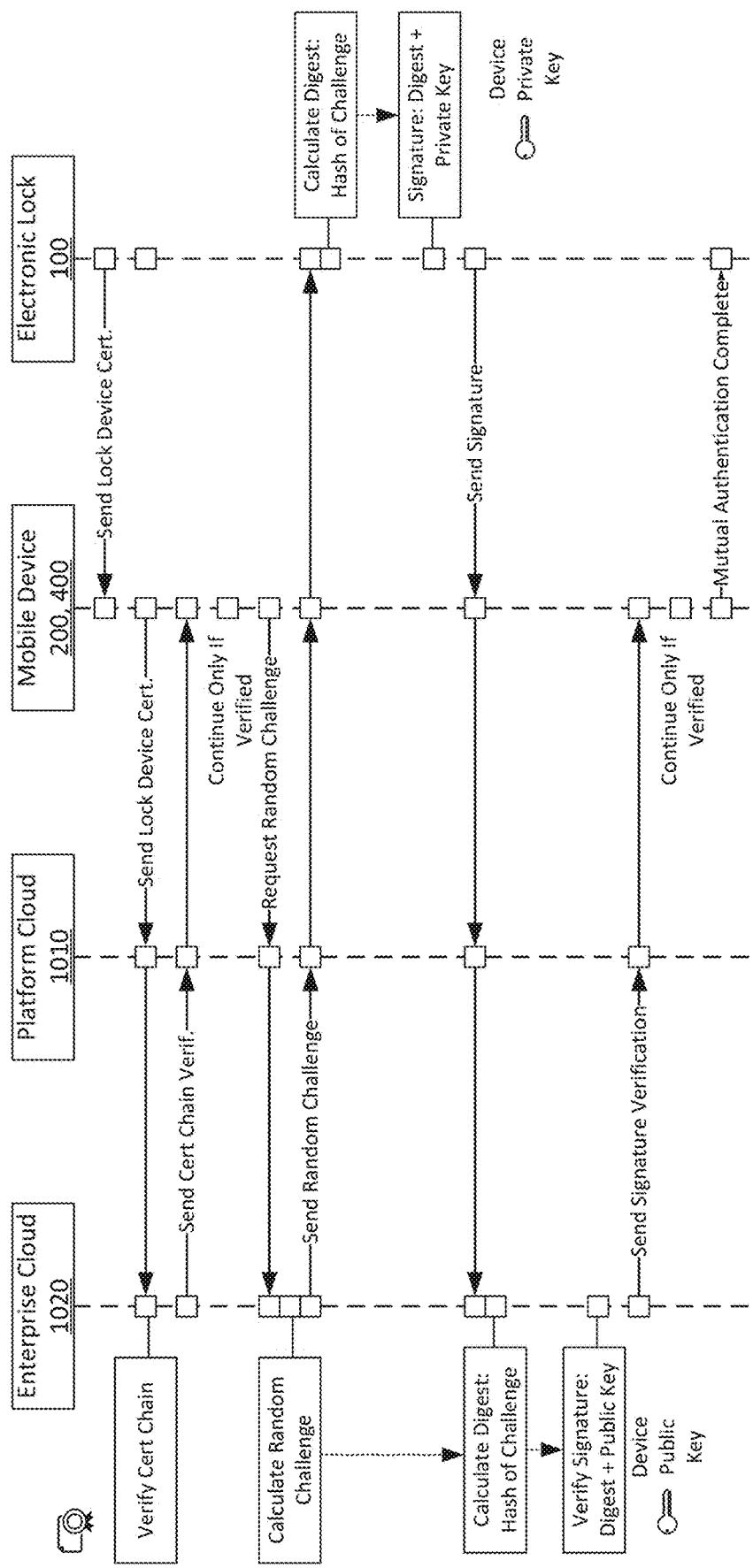
FIG. 11 is a message flow diagram depicting a second portion of a secure communication process including mutual authentication, according to an example embodiment.

FIG. 11 is a message flow diagram depicting a second portion 1100 of a secure communication process including mutual authentication, according to an example embodiment. The second portion 1100 generally corresponds to the platform cloud authenticating the electronic lock 100, thereby completing the mutual authentication process.

In the example shown, if the verification process is successful and the electronic lock has validated the cloud platform, the electronic lock 100 will send a device certificate (e.g., certificate 902) to the mobile device 200, 400. The mobile device will in turn transmit the lock's device certificate to the platform cloud 1020, at which a certificate chain of the device certificate is verified using the device certificate authority certificate (e.g., device certificate authority certificate 904). The verification result of the device can then be returned to the mobile device.

If the device certificate is verified, the mobile device 200, 400 will next initiate a process in which the electronic lock is validated to the cloud platform. Specifically, the mobile device 200, 400 will send a request for a random challenge to the cloud account (e.g., to enterprise cloud 1020 via platform cloud 1010). The enterprise cloud 1020 will calculate a random challenge and return it to the mobile device 200, 400 via the platform cloud 1010, and the mobile device 200, 400 will in turn provide the random challenge to the electronic lock 100. The electronic lock 100 will calculate a digest as a hash of the challenge and calculate a further digital signature using the calculated digest and the device's private key (e.g., key 930 described above). The digital signature will be returned to the mobile device 200, 400, which will in turn provide that digital signature to the cloud account. The enterprise cloud 1020 will similarly calculate a digest representing a hash of the challenge that it provided to the mobile device. The enterprise cloud 1020 will verify the digital signature received from the electronic lock 100 using a corresponding digital signature represented by the digest and the public key of the electronic lock (e.g., a public key of a public-private key pair that includes private key 930). The enterprise cloud 1020 will return a verification result to the mobile device 200, 400 via the platform cloud 1010. Accordingly, the device certificate of the electronic lock 100 is also verified to the mobile device 200, 400. At this stage, mutual authentication between the electronic lock and the cloud account has been completed.

Figure 12:
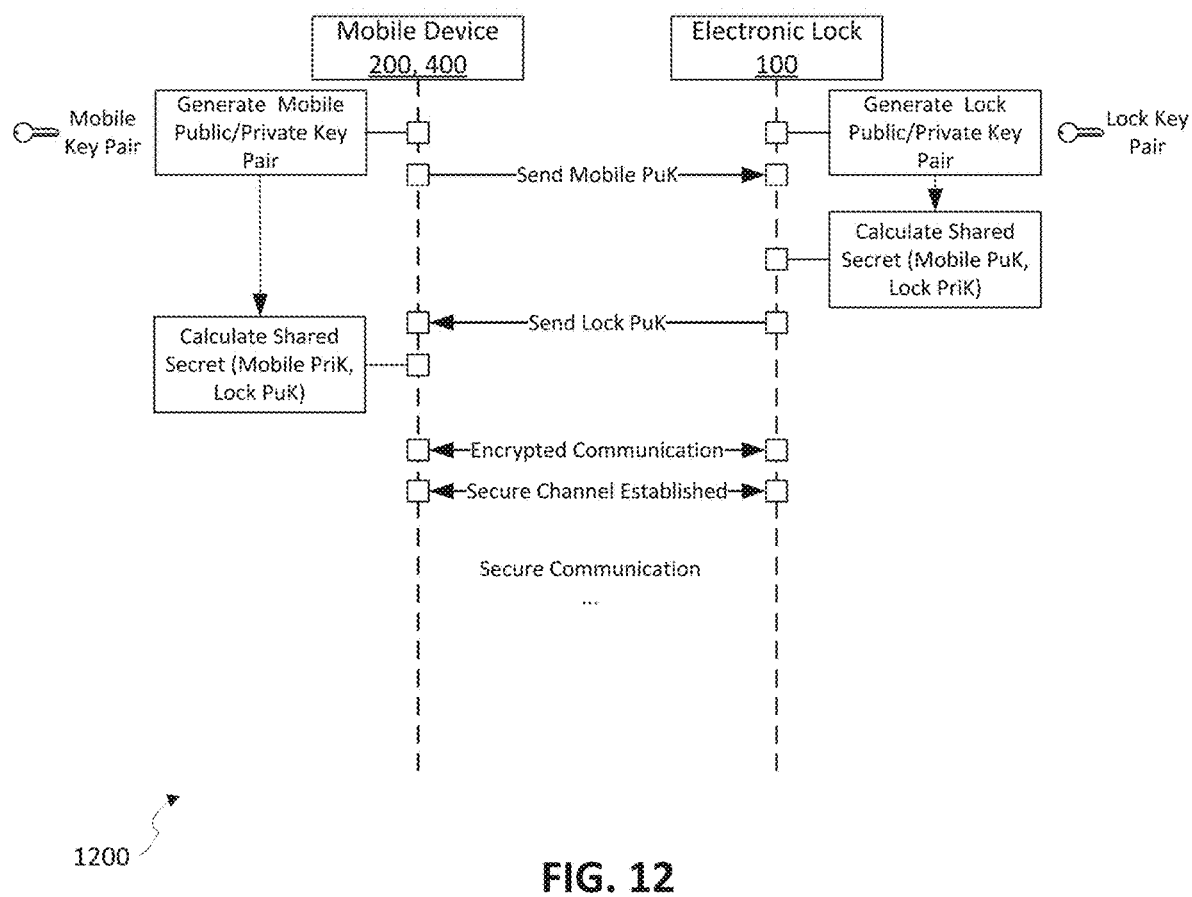
FIG. 12 is a message flow diagram depicting a third portion of a secure communication process including mutual authentication, according to an example embodiment.

FIG. 12 is a message flow diagram depicting a third portion 1200 of a secure communication process including mutual authentication, according to one example embodiment. In this portion of the messaging sequence, mutual authentication has been completed, and the electronic lock 100 and mobile device 200, 400 may exchange cryptographic objects to use for subsequent encrypted communication. In particular, in the example shown, the mobile device 200, 400 may transmit a message to the electronic lock 100 confirming that mutual authentication is complete. Because the cloud platform (including the enterprise cloud 1020 and platform cloud 1010) and electronic lock 100 are now authenticated with each other, and because the mobile application at mobile device 200, 400 is authenticated relative to the cloud platform, a secure channel may be formed over an insecure Bluetooth connection between the mobile device 200, 400 and the electronic lock 100. In particular, in the example shown the mobile device 200, 400 will generate a public-private key pair for key exchange. The mobile device 200, 400 will transmit the public key of the mobile device to the electronic lock 100. Concurrently, the electronic lock 100 will generate a public-private key pair, and transmit the public key of the electronic lock to the mobile device. The mobile device 200, 400 will calculate a shared secret using the private key of the mobile device and the public key of the electronic lock. The electronic lock 100 will calculate a shared secret using the private key of the electronic lock and the public key of the mobile device. An encrypted communication channel may be established over Bluetooth between the mobile device and the electronic lock, e.g., via a shared key generated using the shared secret.

Figure 13:
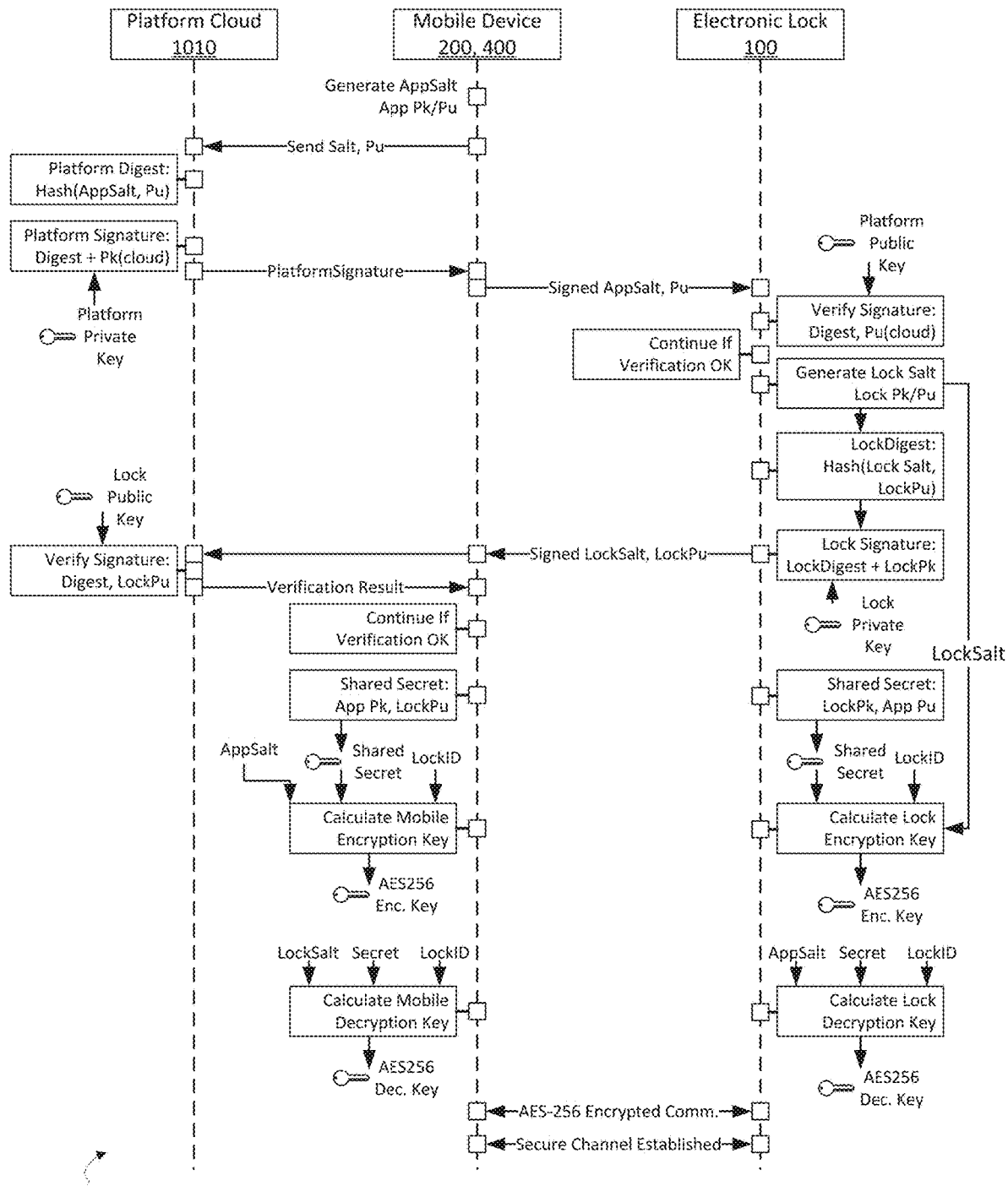
FIG. 13 is a message flow diagram depicting a third portion of a secure communication process including mutual authentication, according to a further example embodiment.

FIG. 13 is a message flow diagram depicting an alternative third portion 1300 of a secure communication process including mutual authentication, according to one example embodiment. In this portion of the messaging sequence, mutual authentication has been completed, and, as in FIG. 12, the electronic lock 100 and mobile device 200, 400 may exchange cryptographic objects to use for subsequent encrypted communication.

While the key exchange seen in FIG. 12 relies on exchange of public keys, in some instances it is preferable to avoid communication of either encryption or decryption keys that are used in secure communication between the electronic lock 100 and mobile device 200, 400 to improve protection against possible man-in-the-middle attacks between the electronic lock 100 and mobile device 200, 400. Generally, and as discussed in greater detail below, both the electronic lock 100 and mobile application are verified to ensure that the encryption key is generated by the same trusted source as was previously authenticated. Additionally, the extent of randomness of the generated encryption key may be improved by use of a key derivation function.

Specifically, as seen in the third portion 1300 of the secure communication process, a mobile device 200, 400 may randomly generate a salt (designated as AppSalt in FIG. 13, also referred to herein as a "device salt") as well as a public-private key pair (App Pu, Pk). The salt may be generated using a 256-bit random salt, generated via a random number generator. The public-private key pair, in this instance, can be a key pair generated at the application using an elliptic-curve (ECDH) public-private key generation process used for key exchange with the electronic lock 100. The salt and the application public key may be sent from the mobile device 200, 400 to platform cloud 1010. The platform cloud 1010 will calculate a platform digest by hashing the salt and the application public key, and will subsequently generate a platform signature using the calculated platform digest and a private key of the platform cloud 1010. The private key of the platform cloud 1010 may be, in this example, a private key of a platform certificate, for example, a private key 940*a-n* described above in conjunction with FIG. 9. In an example embodiment, the SHA2 hashing algorithm may be used; however, in alternative embodiments, other types of hashing algorithms are useable as well.

The platform cloud 1010 will then send back the platform signature to the mobile device 200, 400. The mobile device 200, 400 will use the platform signature to sign the salt and the application public key, which are then sent to the electronic lock 100.

At the electronic lock 100, a platform public key is used to verify the platform signature received from the platform cloud 1010 via the mobile device 200, 400. In this instance, the platform public key may be a platform certificate key, such as may be included in the public cloud certificate authority certificate 916 described above in conjunction with FIG. 9. If the platform signature is successfully verified, the electronic lock 100 will generate a lock salt (analogous to the device or application salt described above), as well as a lock public-private key pair. As above, the lock public-private key pair can be a key pair generated at the electronic lock using an elliptic-curve (ECDH) public-private key generation process, used for key exchange with the mobile device 200, 400. The electronic lock 100 will generate a lock digest by hashing the lock salt and lock public key, and will subsequently generate a lock signature from the lock digest and a lock private key from a lock certificate, such as the private key(s) 930*a-n* of FIG. 9.

The electronic lock 100 will send the signed lock salt, as well as the lock public key of the lock's ECDH key pair, to the mobile device 200, 400, which in turn passes the lock signature to the platform cloud 1010. The platform cloud

1010 will verify the lock signature using the received lock public key, and return a verification result to the mobile device 200, 400.

At this stage, both the mobile device 200, 400 and electronic lock 100 have been verified relative to one another, as well as relative to the platform cloud 1010, since the electronic lock 100 has verified the ECDH keys of the application are from the same device as was previously authenticated, and the, and the platform cloud has verified the keys of the electronic lock 100 are from the same electronic lock previously authenticated (in FIGS. 10-12). Accordingly, assuming verification has occurred successfully, each of the mobile device 200, 400 and electronic lock 100 may generate encryption and decryption keys used for secure channel communications therebetween.

In particular, in the example shown, the mobile device 200, 400 and electronic lock 100 will each generate a shared secret using ECDH keys generated at the application and lock. Specifically, the mobile device 200, 400 will generate a shared secret using the application private key and lock public key, while the electronic lock 100 will generate a shared secret using the lock private key and application public key. At the mobile device 200, 400, an encryption key may be generated using the application salt, the shared secret generated at the mobile device 200, 400, as well as a lock identifier (lock ID). The mobile device 200, 400 will also generate a decryption key using the lock salt, shared secret, and lock ID.

At the electronic lock 100, an encryption key is generated from the shared secret, lock ID, and lock salt. Additionally, a decryption key is generated from the application salt, shared secret, and lock ID. It is noted that the encryption key generated at the electronic lock 100 is the equivalent of the decryption key generated at the mobile device 200, 400, and the decryption key generated at the electronic lock 100 is the equivalent of the encryption key generated at the mobile device 200, 400.

In example embodiments, calculation of the encryption and decryption keys at the mobile application 200, 400 and at the electronic lock 100 may be performed using a key derivation function, such as a HMAC key derivation function (HKDF) to generate AES256 encryption keys and decryption keys. Alternative key derivation functions may be used as well.

Upon completion of generating encryption and decryption keys at the mobile device 200, 400 and electronic lock 100, encrypted communications may be established between those devices. Thereafter, a secure channel is established between the devices that does not rely on the native Bluetooth key management at mobile device 200, 400. Rather, the mobile device 200, 400 may store encryption keys and decryption keys associated with an identifier of the electronic lock (or electronic lock—mobile device pair), for example using a iOS keychain in iOS, or in an Android keystore system, depending on the particular mobile device used. Similarly, the electronic lock 100 will store the encryption and decryption keys using a secure element in the BLE control unit, associated with an identifier provided by the mobile application for matching during subsequent BLE communication sessions. That is, the encryption and decryption keys generated by way of the processes described in FIG. 13 may be maintained at the mobile device 200, 400 and electronic lock 100 for subsequent communication between those specific devices. The encryption and decryption keys may be maintained in those devices until the lock is deactivated, factory reset, or until access to the lock is revoked, for example by an administrative user.

Figure 14:
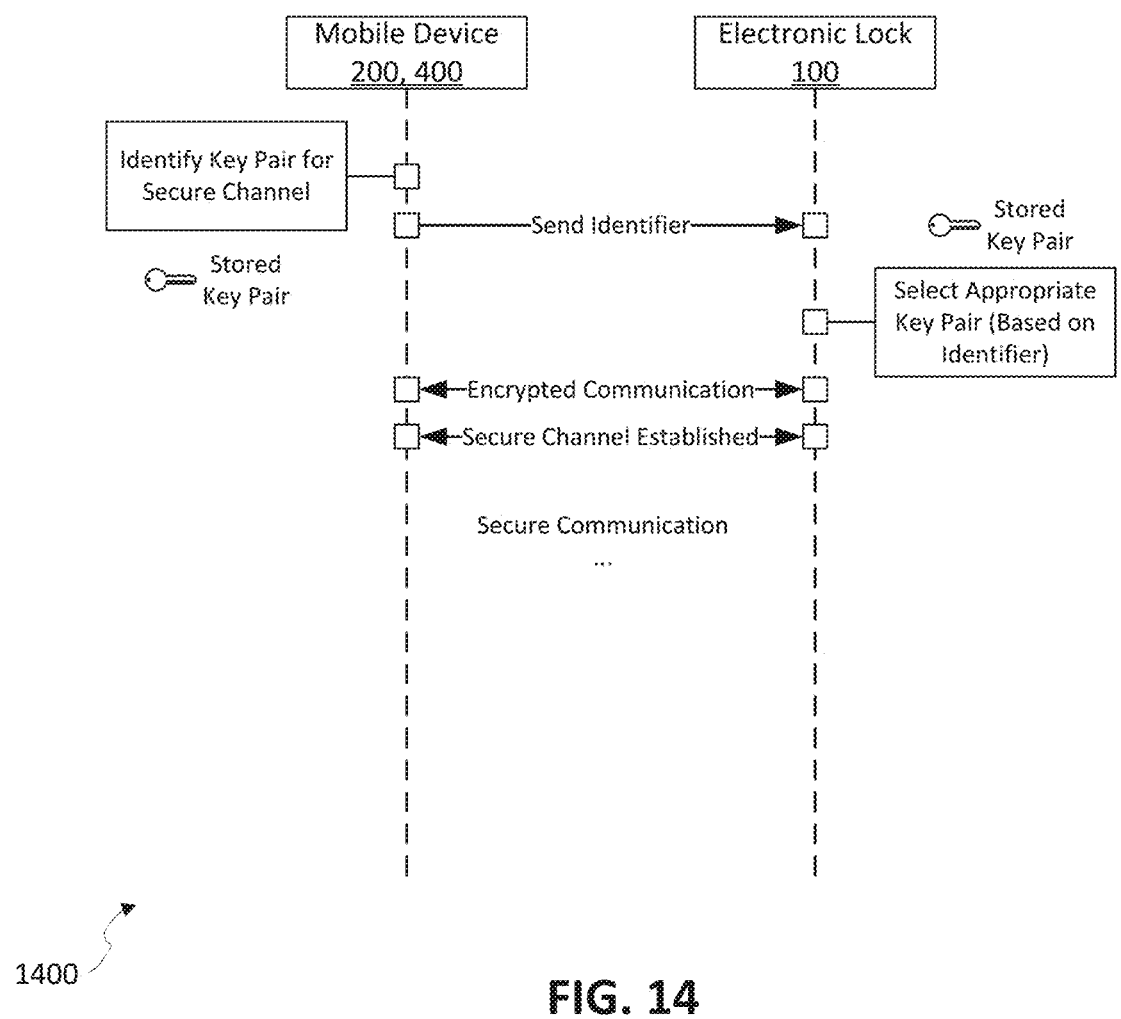
FIG. 14 is a message flow diagram depicting a subsequent message flow after mutual authentication and key exchange between a mobile device and an electronic lock, according to an example embodiment.

Referring to FIG. 14, a further communication sequence 1400 is shown, illustrating subsequent communication between a mobile device 200, 400 and electronic lock 100. In this instance, the mobile device 200, 400 will identify a particular key pair for use in communication via a secure channel with a particular electronic lock 100. The mobile device 200, 400 will send a message to the electronic lock 100 including an identifier, such as the identifier described above which is maintained at both the mobile device 200, 400 and electronic lock 100 as associated with the generated key pair. The electronic lock 100 may then retrieve an appropriate key pair based on the identifier, and encrypted communication may be established between the devices. Accordingly, a secure channel may be established between the mobile device 200, 400 and electronic lock 100 without regenerating encryption keys and decryption keys at the respective devices.

Referring to the above process(es) generally, it is noted that certain aspects may be performed in different orders. For example, in some implementations the electronic lock may be authenticated to the cloud account before the cloud account is authenticated to the electronic lock, or vice versa (e.g., swapping portions of process seen in FIGS. 10-11, respectively). Additionally, referring to FIG. 13 generally, it is noted that certain steps within the third portion 1300 may be performed in a different order in different embodiments. For example, in some instances the electronic lock 100 may generate the lock salt and public/private keys, lock digest, and lock signature for verification at the platform cloud 1010 prior to the mobile device 200, 400 generating the application salt, application public/private keys, and the platform cloud 1010 generating a platform digest and signature for verification at the electronic lock 100. That is, the ordering in which signatures are verified between the platform cloud 1010 and the electronic lock 100 is a matter of design choice.

Furthermore, the above-described methods and process flows of FIGS. 10-14 are illustrated as occurring without requiring a corresponding bonding process between the electronic lock and mobile device (e.g., mobile devices 200, 400). While such a bonding process may be used at the time of initial connection in FIG. 10 and removed by the time secured communication occurs in FIG. 14, such configurations are optional, and excluded entirely in at least some circumstances, for example, where a mobile device is configured for sequential pairing to and configuration of electronic locks.

Additionally, while the above mutual authentication process is described as being performed by a number of mobile devices including an admin mobile device 200 and a guest mobile device 400, it is recognized that other configurations may be used as well. For example, after an admin mobile device 200 has performed a mutual authentication process and has exchanged public keys with the electronic lock 100, in alternative embodiments, the admin mobile device 200 may synchronize the lock public key and optionally a shared key to the cloud to be shared with other devices; in that way, guest mobile devices would be able to be authenticated by the cloud and would receive a shared key, allowing those guest mobile devices to communicate with the electronic lock without having to execute the mutual authentication process described above. Because the keys are stored in a secure location within application storage and within the electronic lock, compromise of such keys is minimized.

Furthermore, in circumstances where a key for each electronic lock is unique, in example embodiments, a re-authentication process may be required each time the electronic lock is power cycled. For example, at the time an electronic lock is power cycled, during a next communication sequence with a trusted mobile device (e.g., admin mobile device 200 or guest mobile device 400), a new mutual authentication process may be required, and a new set of encryption keys (and new shared key) generated and optionally propagated to other authorized mobile devices.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of establishing secure communication with a mobile device at an electronic lock, the method comprising:
    establishing a communication connection between the electronic lock and a mobile device over a short-range wireless communication protocol;
    performing an authentication process between the electronic lock and the mobile device;
    after performing the authentication process:
        generating a key pair at the electronic lock, the key pair including a lock public key and a lock private key; and
        receiving a device public key from the mobile device; and
        generating an encryption key at the electronic lock based on a shared secret, the shared secret being obtained from the lock private key and the device public key; and
    performing encrypted communication between the electronic lock and the mobile device using the encryption key, the encrypted communication occurring via an unbonded connection using the short-range wireless communication protocol.

2. The method of claim 1, further comprising, at the mobile device, generating a second key pair including a device private key and the device public key.

3. The method of claim 1, further comprising generating a decryption key based on the shared secret, wherein the decryption key is equivalent to a device encryption key.

4. The method of claim 3, wherein performing encrypted communication between the electronic lock and the mobile device using the encryption key includes:
    receiving encrypted data from the mobile device; and
    decrypting the encrypted data using the decryption key.

5. The method of claim 1, wherein the encryption key is equivalent to a device decryption key.

6. The method of claim 1, further comprising, in response to receiving an indication to remove access for a user, deleting the key pair.

7. The method of claim 6, further comprising, in response to receiving an account identifier associated with the user, deleting account details associated with the account identifier.

8. The method of claim 1, wherein performing encrypted communication between the electronic lock and the mobile device occurs during a subsequent communication session after authenticated communication based on the authentication process has been terminated.

9. A method of establishing secure communication between a mobile device at an electronic lock, the method comprising:
    establishing a communication connection between the electronic lock and a mobile device over a short-range wireless communication protocol;
    performing an authentication process between the electronic lock and the mobile device;
    after performing the authentication process:
        generating a key pair at the mobile device, the key pair including a device public key and a device private key; and
        receiving a lock public key from the electronic lock; and
        generating an encryption key at the mobile device based on a shared secret, the shared secret being obtained from the device private key and the lock public key; and
    performing encrypted communication between the electronic lock and the mobile device using the encryption key, the encrypted communication occurring via an unbonded connection using the short-range wireless communication protocol.

10. The method of claim 9, further comprising at the electronic lock, generating a second key pair including a lock private key and the lock public key.

11. The method of claim 9, wherein the communication connection between the electronic lock and the mobile device over the short-range wireless communication protocol is a bonded connection.

12. The method of claim 9, further comprising receiving a lock identifier from the electronic lock, wherein generating the encryption key is further based on the lock identifier.

13. The method of claim 9, further comprising receiving a lock salt from the electronic lock, wherein generating the encryption key is further based on the lock salt.

14. The method of claim 13, further comprising transmitting a device salt to the electronic lock.

15. The method of claim 14, wherein the device salt is generated using a 256-bit random salt generated using a random number generator.

16. A method of establishing secure communication between a mobile device and an electronic lock, the method comprising:
    establishing a communication connection between the mobile device and the electronic lock over a short-range wireless communication protocol;
    performing an authentication process between the electronic lock and the mobile device;
    after performing the authentication process:

generating, at the mobile device, a device key pair including a device public key and a device private key;

generating, at the electronic lock, a lock key pair including a lock public key and a lock private key;

transmitting, from the mobile device to the electronic lock, the device public key;

generating, at the electronic lock, a shared secret, the shared secret being obtained from the lock private key and the device public key;

transmitting, from the electronic lock to the mobile device, the lock public key; and generating, at the mobile device, the shared secret, the shared secret being obtained from the device private key and the lock public key; and performing encrypted communication between the electronic lock and the mobile device using the shared secret, the encrypted communication occurring via an unbonded connection using the short-range wireless communication protocol.

17. The method of claim 16, wherein performing encrypted communication between the electronic lock and the mobile device using the shared secret includes:

encrypting data at the mobile device based on the shared secret;

transmitting the encrypted data from the mobile device to the electronic lock; and decrypting the encrypted data at the electronic lock based on the shared secret.

18. The method of claim 16, wherein performing encrypted communication between the electronic lock and the mobile device using the shared secret includes:

encrypting data at the electronic lock based on the shared secret;

transmitting the encrypted data from the electronic lock to the mobile device; and decrypting the encrypted data at the mobile device based on the shared secret.

19. The method of claim 16, wherein performing the authentication process between the electronic lock and the mobile device includes:

a mobile device authentication phase comprising:

transmitting, from the mobile device to the electronic lock, a device certificate;

verifying, at the electronic lock, the device certificate received from the mobile device relative to a public version of the device certificate;

transmitting, from the electronic lock to the mobile device, a verification result;

transmitting, from the mobile device to the electronic lock, a random challenge request;

generating, at the electronic lock, a random challenge;

transmitting, from the electronic lock to the mobile device, the random challenge;

transmitting, from the mobile device to the electronic lock, a digital signature, the digital signature being generated by a certificate holder and based, at least in part, on the random challenge;

verifying, at the electronic lock, the digital signature based on the random challenge and a public key of the certificate holder; and transmitting, from the electronic lock to the mobile device, a result of verifying the validation of the digital signature.

20. The method of claim 16, wherein performing the authentication process between the electronic lock and the mobile device includes:

an electronic lock authentication phase comprising:

transmitting, from the electronic lock to the mobile device, a lock certificate;

transmitting, from mobile device to a cloud account, the lock certificate;

receiving, at the mobile device from the cloud account, a certificate verification result;

in response to the lock certificate being verified, transmitting a random challenge from the mobile device to the electronic lock;

transmitting, from the electronic lock to the mobile device, a digital signature, the digital signature being based, at least in part, on the random challenge;

transmitting, from the mobile device to the cloud account, the digital signature; and receiving, at the mobile device from the cloud account, a signature verification result, the signature verification result based, at least in part, on the random challenge and a public key of the electronic lock.

* * * * *